(12) United States Patent
Loop et al.

(10) Patent No.: US 11,498,040 B2
(45) Date of Patent: *Nov. 15, 2022

(54) TUBULAR REACTOR FOR SUPERCRITICAL WATER REACTION

(71) Applicants: Thomas Erik Loop, Seattle, WA (US); James D. Flynn, Auburn, WA (US); G. Graham Allan, Kenmore, WA (US)

(72) Inventors: Thomas Erik Loop, Seattle, WA (US); James D. Flynn, Auburn, WA (US); G. Graham Allan, Kenmore, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/222,618

(22) Filed: Apr. 5, 2021

(65) Prior Publication Data

US 2022/0023814 A1    Jan. 27, 2022

Related U.S. Application Data

(63) Continuation of application No. 16/550,255, filed on Aug. 25, 2019, now Pat. No. 10,967,349, which is a continuation-in-part of application No. 15/943,691, filed on Apr. 2, 2018, now Pat. No. 10,421,052, which is a continuation-in-part of application No.
(Continued)

(51) Int. Cl.
*B01J 8/00* (2006.01)
*B01J 3/00* (2006.01)
*B01J 19/18* (2006.01)

(52) U.S. Cl.
CPC .......... *B01J 8/008* (2013.01); *B01J 3/008* (2013.01); *B01J 8/0045* (2013.01); *B01J 19/1812* (2013.01); *B01J 2208/00769* (2013.01)

(58) Field of Classification Search
CPC ....... B01J 3/00; B01J 3/008; B01J 3/02; B01J 3/042; B01J 19/1812; B01J 19/2415; B01J 8/0045; B01J 2219/00166; B01J 2219/00135; B01J 2219/00247;
(Continued)

(56) References Cited

U.S. PATENT DOCUMENTS

2002/0006367 A1*  1/2002  Matsubara .............. C10G 1/10
                                                                422/208

* cited by examiner

*Primary Examiner* — Lessanework Seifu
(74) *Attorney, Agent, or Firm* — Thomas E. Loop

(57) ABSTRACT

The machinery and methods disclosed herein are based on the use of a specialized extruder configured to continuously convey and plasticize/moltenize selected lignocellulosic biomass and/or waste plastic materials into a novel variable volume tubular reactor, wherein the plasticized/moltenized material undergoes reaction with circumferentially injected supercritical water—thereby yielding valuable simple sugar solutions and/or liquid hydrocarbon mixtures (e.g., "neo-diesel"), both of which are key chemical commodity products. The reaction time may be adjusted by changing the reactor volume. The machinery includes four zones: (1) a feedstock conveyance and plasticization/moltenization zone; (2) a steam generation and manifold distribution zone; (3) a central supercritical water reaction zone; and (4) a pressure let-down and reaction product separation zone. The machinery and methods minimize water usage—thereby enabling the economic utilization of abundant biomass and waste plastics as viable renewable feedstocks for subsequent conversion into alternative liquid transportation fuels and valuable green-chemical products.

1 Claim, 21 Drawing Sheets

Related U.S. Application Data

14/549,508, filed on Nov. 20, 2014, now Pat. No. 9,932,285, which is a continuation-in-part of application No. 13/297,217, filed on Nov. 15, 2011, now Pat. No. 8,980,143, which is a continuation of application No. 12/828,102, filed on Jun. 30, 2010, now Pat. No. 8,057,666, which is a continuation of application No. 12/402,489, filed on Mar. 11, 2009, now Pat. No. 7,955,508.

(60) Provisional application No. 61/110,505, filed on Oct. 31, 2008, provisional application No. 61/035,380, filed on Mar. 11, 2008.

(58) Field of Classification Search
CPC ...... B01J 2219/0045; B01J 2219/00006; B01J 2208/00769
See application file for complete search history.

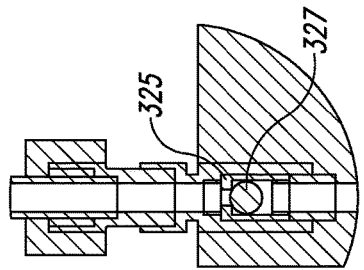
Fig. 3I
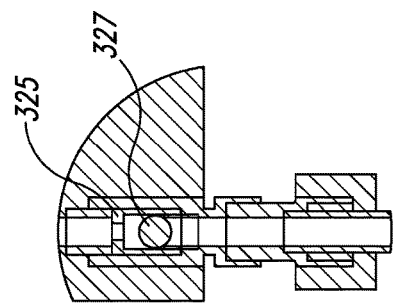
Fig. 3J
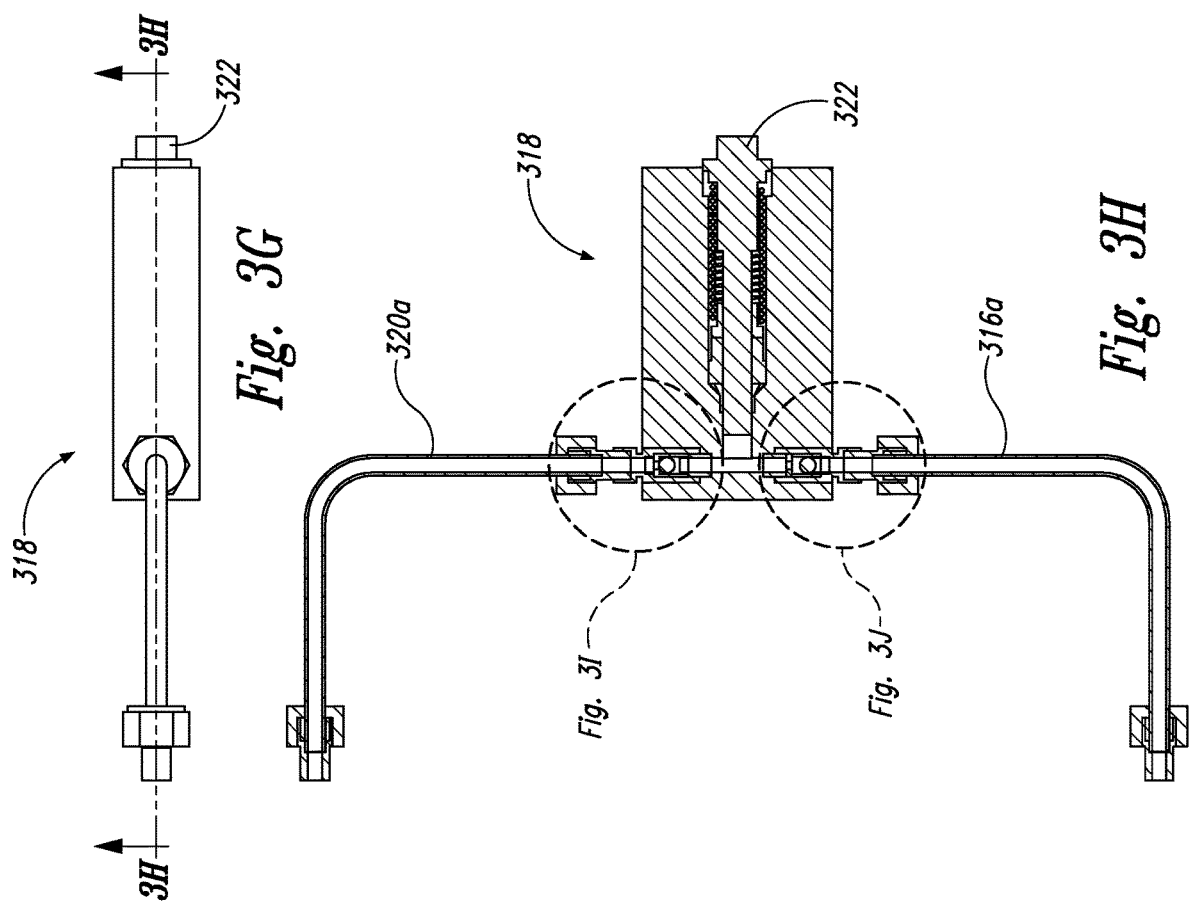
Fig. 3G
Fig. 3H

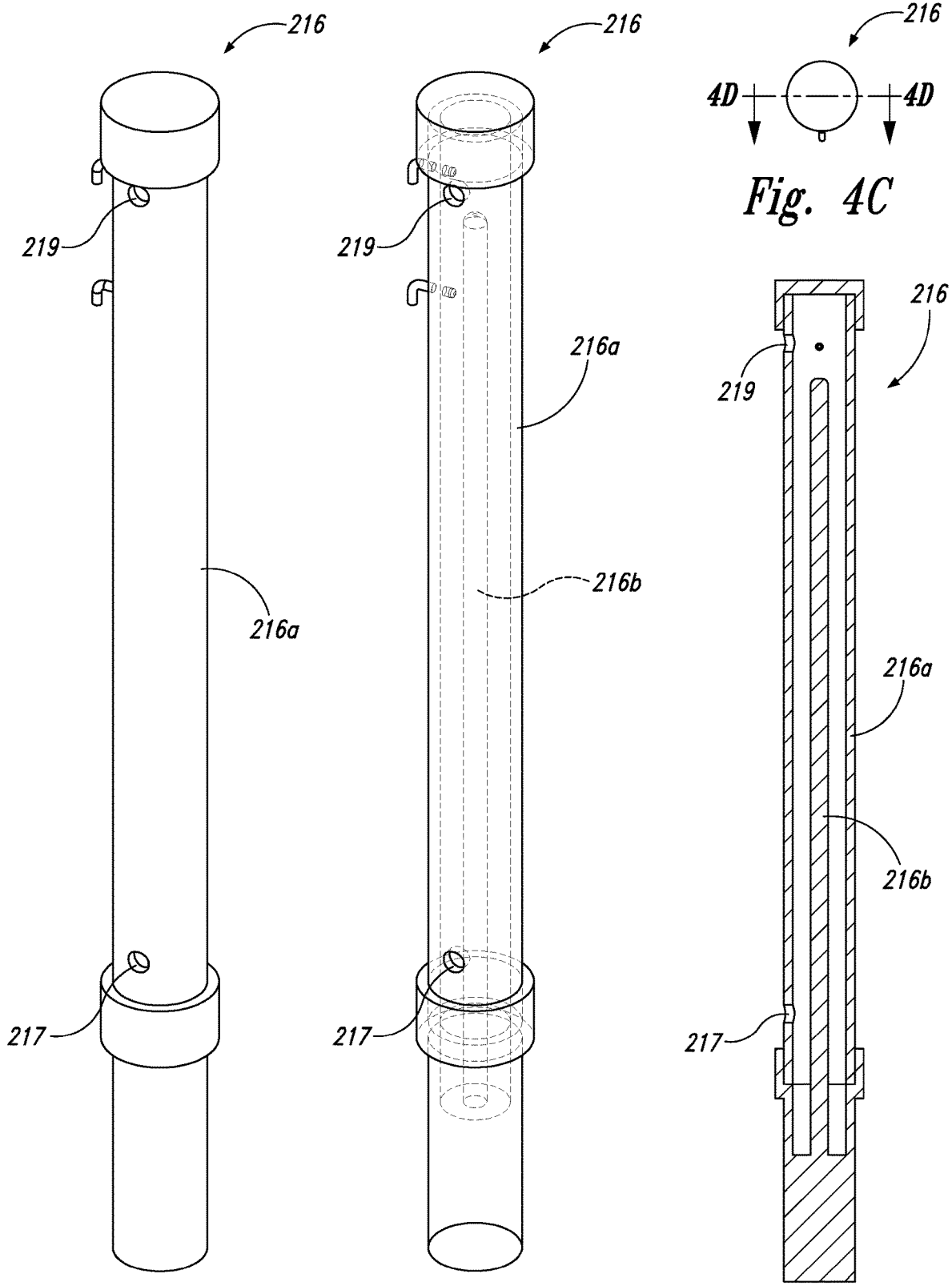

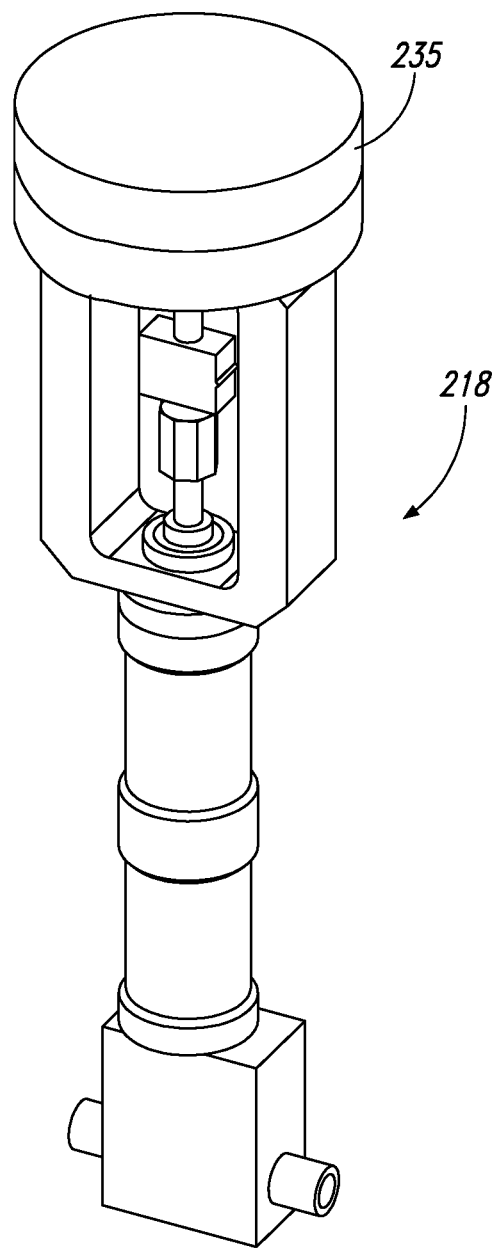
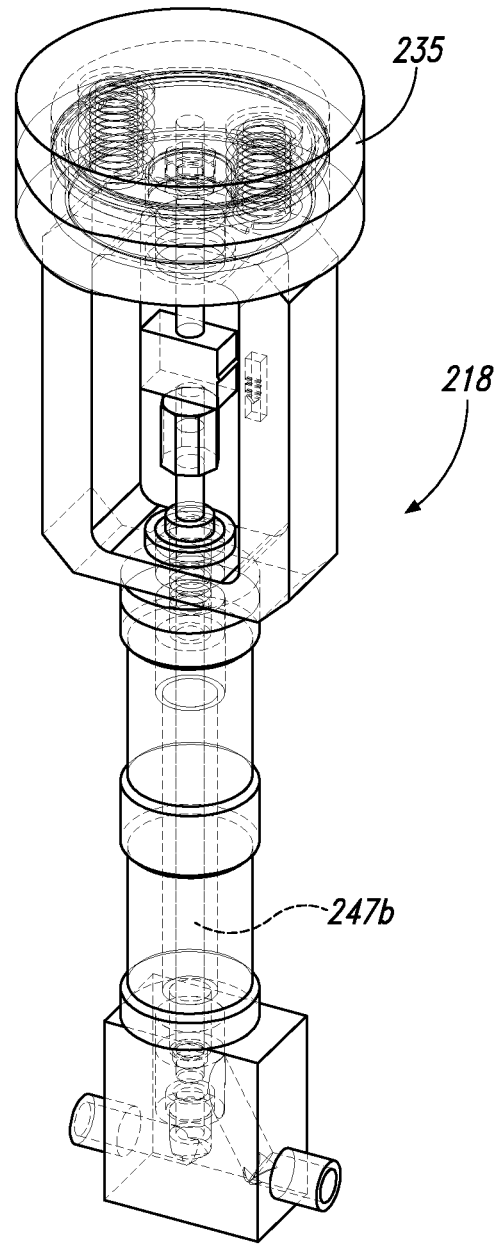
Fig. 5A
Fig. 5B

TUBULAR REACTOR FOR SUPERCRITICAL WATER REACTION

CROSS-REFERENCE TO RELATED APPLICATIONS

This application is a continuation of U.S. application Ser. No. 16/550,255 filed on Aug. 25, 2019 (now U.S. Pat. No. 10,967,349), which application is a continuation-in-part of U.S. application Ser. No. 15/943,691 filed on Apr. 2, 2018 (now U.S. Pat. No. 10,421,052), which application is a continuation-in-part of U.S. application Ser. No. 14/549,508 filed on Nov. 20, 2014 (now U.S. Pat. No. 9,932,285), which application is a continuation-in-part of U.S. application Ser. No. 13/297,217 filed on Nov. 15, 2011 (now U.S. Pat. No. 8,980,143), which application claims the benefit of priority to U.S. application Ser. No. 12/828,102 filed on Jun. 30, 2010 (now U.S. Pat. No. 8,057,666) and U.S. application Ser. No. 12/402,489 filed on Mar. 11, 2009 (now U.S. Pat. No. 7,955,508), which applications claim the benefit of priority to U.S. Provisional Application No. 61/110,505 filed on Oct. 31, 2008, and to U.S. Provisional Application No. 61/035,380 filed on Mar. 11, 2008, all of which applications are all incorporated herein by reference in their entireties for all purposes.

TECHNICAL FIELD

The present invention relates generally to machinery, devices and related methods useful for transforming polymeric materials, including solid biomass and waste plastics, into a plurality of liquid reaction products by way of supercritical water reaction. The green technology disclosed herein enables the economic utilization of abundant biomass and waste plastics as viable renewable feedstocks (as opposed to feedstocks derived from fossil fuels) for conversion into alternative liquid transportation fuels and valuable green-chemical products.

BACKGROUND OF THE INVENTION

The potential of utilizing lignocellulosic biomass and waste plastics as viable feedstocks for conversion into liquid transportation fuels and other green-chemical products is now well recognized. Unfortunately, most existing biomass and waste plastic conversion schemes tend to focus on either traditional thermochemical (pyrolysis and acid hydrolysis) or biological (enzyme attack) pretreatment regimes and are, therefore, believed to be inefficient from a modern chemical engineering perspective. There exists, however, another very promising new approach that utilizes the amazing transformational properties of "supercritical water" (SCW) to rapidly depolymerize and liquefy giant biomass and/or waste plastic molecules into valuable simple sugar solutions and/or oily hydrocarbon mixtures, both of which are key chemical intermediates (commodities) that, in turn, are desirable products for makers of alternative transportation fuels (refiners) and green-chemical products (chemical companies). Indeed, and in recent years, two such green-chemical products producers have emerged in the marketplace; namely, Renmatix, Inc. (King of Prussia, Pa.) and Licella Pty Ltd. (New South Wales, Australia). Both of these newly emergent green technology companies utilize conventional slurry pumping (conveying) and static flow-through SCW reactor technologies to treat various biomass and/or waste plastic material feedstocks via supercritical water reaction. Conventional slurry pumps and static flow-through SCW reactors, however, require the transport (conveyance), heating and pressuring of great excesses of water in order to operate properly. The transport (conveyance), heating, and pressurizing of excess water is energetically and economically unfavorable.

With regards to the processing of waste plastics (and polystyrene in particular), another green-chemical product (crude oil from waste plastics) producer that has also recently emerged is Agilyx, Inc. (Portland, Oreg.). Agilyx describes itself as an "environmental technology and development company that extracts value from difficult-to-recycle mixed plastic waste streams." To this end, Agilyx has purportedly developed a system capable of converting mixed waste plastics into a high-quality crude oil product (which, in turn, is sold to a local petroleum refinery (Tacoma, Wash.) for blending and subsequent refining). In brief, Agylix's technology may best be described as a modified pyrolysis process in which mixed waste plastics are first heated to form hydrocarbon gases, which gases are then subsequently condensed back into liquid form (thereby creating a hydrocarbon oil from what was once plastic). Because the unmitigated breaking (scission) of carbon-carbon bonds (of the polymeric material) via pyrolysis yields pairs of highly reactive free-radicals, a significant amount of char is necessarily formed (as the various sized free-radicals quickly bond and condense back together). The formation of any char products is undesirable because char is a useless solid material with no (or negative) commercial value.

Because of recent governmental initiatives to combat global warming and reduce domestic reliance on foreign petroleum products (through the development of alternative green energy and renewable chemical sources), and because of a strong societal desire to find alternative uses for biomass and waste plastics, the market potential for an alternative green technology platform that can rapidly transform biomass and/or waste plastics into liquid fuel and green-chemical products is believed to be unparalleled.

Accordingly, and although some progress has been made with respect to biomass and waste plastic materials conversion technologies, there is still a need in the art for new and improved biomass and/or waste plastic conversion machines, systems and related methods. There is also a need for transportable (by land or sea) machinery and methods that enable continuous supercritical water reaction of solid polymeric materials with minimal water usage and with changeable (tunable) residence times to thereby allow processing of a wide variety of different mixed polymeric feedstocks. The present invention fulfills these needs and provides for further related advantages.

SUMMARY OF THE INVENTION

In brief, the present invention in an embodiment is directed to a machine for transforming one or more selected polymeric feedstock materials (such as a solid biomass and/or waste plastic material) into a plurality of reaction products via supercritical water reaction. The inventive machine disclosed herein comprises (1) an extruder having an inlet and a downstream outlet, wherein the downstream outlet is coincident with the longitudinal axis of the extruder; (2) a steam generator fluidically connected to a downstream inlet manifold, wherein the inlet manifold forms a ring having a plurality of inwardly facing exit portals, wherein the plurality of exit portals is circumferentially positioned about the inner surface of the ring; and (3) a tubular reactor having an interior space fluidically connected to an inlet end and an outlet end (of the tubular reactor), wherein the inlet end of the tubular reactor is adjacent and fluidically connected to both (i) the outlet of the extruder, and (ii) the plurality of circumferentially positioned exit portals of the inlet manifold. In addition, the outlet end of the tubular reactor is fluidically connected to (at least) a first downstream chamber.

The inventive machine in other embodiments further comprises a movable (adjustably extendable) ram centrally positioned within the tubular reactor. The ram (which may take the form of a rod and is sometimes referred to as a "spear") is movable back and forth within and along the longitudinal axis of the tubular reactor to thereby increase or decrease the volume of the interior space of the tubular reactor. In this way, the residence time of the supercritical water reaction occurring within the tubular reactor (during operation of the machine) may be selectively and readily changed (with longer residence times corresponding to larger reactor volumes).

In accordance with the biomass and/or waste plastic material liquefaction methods disclosed herein, a specialized single screw extruder is utilized to convey, while heating and increasing pressure from atmospheric to about or greater than 3,200 psi, a selected low-water content solid biomass and/or waste plastic feedstock material from an upstream hopper to a downstream tubular reactor. The selected feedstock material becomes heated, pressurized, and plasticized/moltenized (i.e., turns into a molten state) while travelling down the heated barrel of the extruder before exiting through a specialized extruder outlet (or die). The extruder outlet, in turn, is fluidically connected to an adjacent inlet manifold that, in turn, includes a plurality of circumferentially positioned and inwardly directed exit ports. The exit ports are configured to circumferentially inject supercritical or high-energy water into the tubular reactor and impinge upon the molten feedstock material (that is flowing centrally therethrough during operation of the machine). A novel cone-shaped occlusion (having a plurality of reactant flow through-holes positioned about a base plate of the cone portion) is centrally positioned and axially aligned at the reactor's frontend to facilitate spreading and thinning of the centrally flowing molten feedstock material (as the material flows over the cone), thereby enabling the near-instantaneous penetration and mixing of the centrally flowing molten feedstock material with regulated (or minimum) amounts of supercritical/high-energy water.

The reaction time within the variable volume flow-through SCW reactor may be, in some embodiments, controlled by adjustably and/or selectively positioning the ram (centrally positioned within the tubular reactor and sometimes referred to as a "spear") to either contract ("ram-in") or expand ("ram-out") the volume of the otherwise tubular reaction chamber. In other embodiments, the length of the ram is preselected and nonadjustable.

In still further embodiments, a circumferentially positioned, high efficiency alternating current induction coil (that is part of an induction heater) surrounds the tubular reactor and supplies additional heat energy when needed (for example, to maintain steady state conditions during operation of the machine). Similarly, a plurality of outer heating bands is positioned about the barrel of the extruder for preheating the selected feedstock material (as the material travels down the barrel of the extruder). In this way, a minimum amount of water is conveyed, heated, pressurized and used for reaction and liquefaction. Moreover, the reaction (residence) time may be appropriately adjusted (tuned) to accommodate different types of polymeric material feedstocks.

These and other aspects of the present invention will become more evident upon reference to the following detailed description and accompanying drawings. It is to be understood, however, that various changes, alterations, and substitutions may be made to the specific embodiments disclosed herein without departing from their essential spirit or scope.

BRIEF DESCRIPTION OF THE DRAWINGS

The drawings are intended to be illustrative and symbolic representations of certain exemplary embodiments of the present invention, and as such they are not necessarily drawn to scale. In addition, it is to be expressly understood that the relative dimensions and distances depicted in the drawings are exemplary and may be varied in numerous ways. Finally, like reference numerals have been used to designate like features throughout the many different views of the drawings.

FIGS. 3A-J show various different views (e.g., solid perspective, see-through, cross-sectional, and enlarged) of the water intake and outtake manifolds fluidicly connected to the high pressure positive displacement pump component of the machine depicted in FIG. 1.

FIGS. 4A-D show a solid perspective, a see-through perspective, a top, and a side cross-sectional view of the steam generator component of the machine depicted in FIG. 1.

FIGS. 5A-H show various different views (e.g., solid perspective, see-through, bottom, cross-sectional, and enlarged) of the high-pressure valve assembly component (first, second, and third) of the machine depicted in FIG. 1.

DETAILED DESCRIPTION OF INVENTION

The present invention in an embodiment is directed to a novel machine for transforming one or more selected polymeric feedstock materials, including solid biomass and/or waste plastic materials, into a plurality of valuable reaction products by way of continuous supercritical water ("SCW") reaction. Unlike known SCW conversion schemes that use excessive amounts of water (and energy to heat and pressurize the same), the novel machine of the present invention enables the economic utilization of abundant biomass and waste plastics as viable renewable feedstocks (as opposed to fossil fuel derived feedstocks) for conversion into alternative liquid transportation fuels and valuable green-chemical products. The novel machine disclosed herein uses highly regulated (or minimum) amounts of water for feedstock reaction and liquefaction. In addition, the volume (and residence time) of the novel SCW reactor disclosed herein is selectively adjustable (tunable) to enable the processing of a wide range of mixed polymeric materials.

As used herein, the term "biomass" means any plant or plant-derived material. The term "waste plastic" means any synthetic or semi synthetic organic amorphous solid material derived from petroleum oil and/or natural gas that has been discarded or otherwise used. The term "supercritical water" means water at or above its critical point of about 647 K (374° C. or 705° F.) and 22.064 MPa (3,200 psi or 218 atm). The term "high-energy water" means hot compressed water or supercritical water. The term "plasticize/moltenize" means to change a material from a solid state to a semi-solid flowable state. The term "extrudate" means the flowable material exiting the outlet end of an extruder during its operation. All other terms used herein shall have their plain and ordinary meaning unless the context of its usage clearly suggests otherwise.

Figure 1:
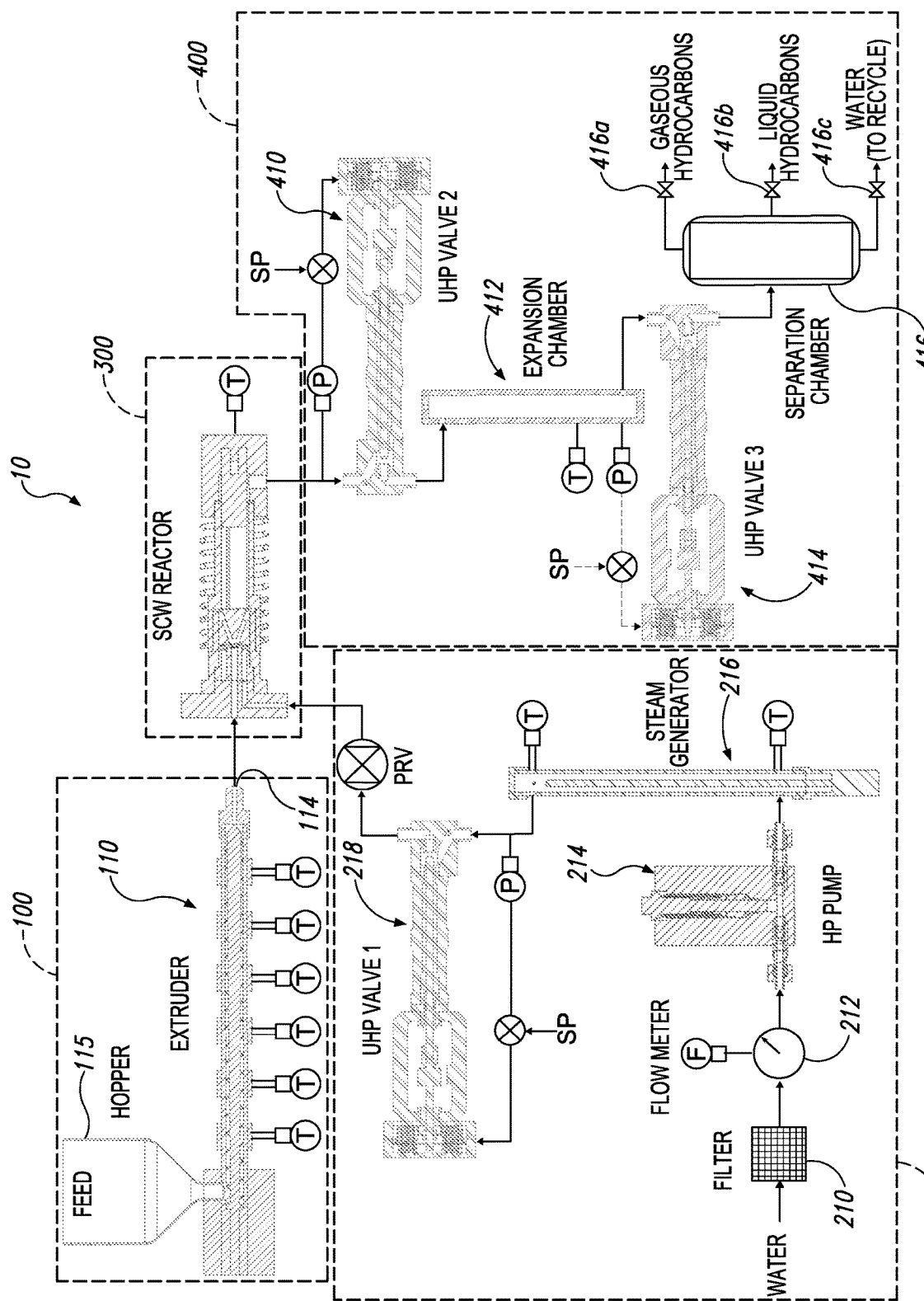
FIG. 1 shows a process flow diagram that details the flow of materials into and out of the various components of a machine and system for transforming solid biomass and/or waste plastic feedstock materials into various liquid hydrocarbon products, including simple sugar solutions and/or oily hydrocarbon mixtures, via supercritical water reaction (in accordance with certain exemplary embodiments of the present invention). The process flow diagram depicts (within separate closed "dashed-line" ("- - - - -") regions), among other things, four distinct processing zones; namely, (1) an upstream extruder-based biomass and/or waste plastic materials conveyance and plasticization/moltenization zone, (2) an upstream steam generation and manifold distribution zone, (3) a central supercritical water reaction zone, and (4) a downstream pressure let-down and reaction product separation zone.
Figure 2A:
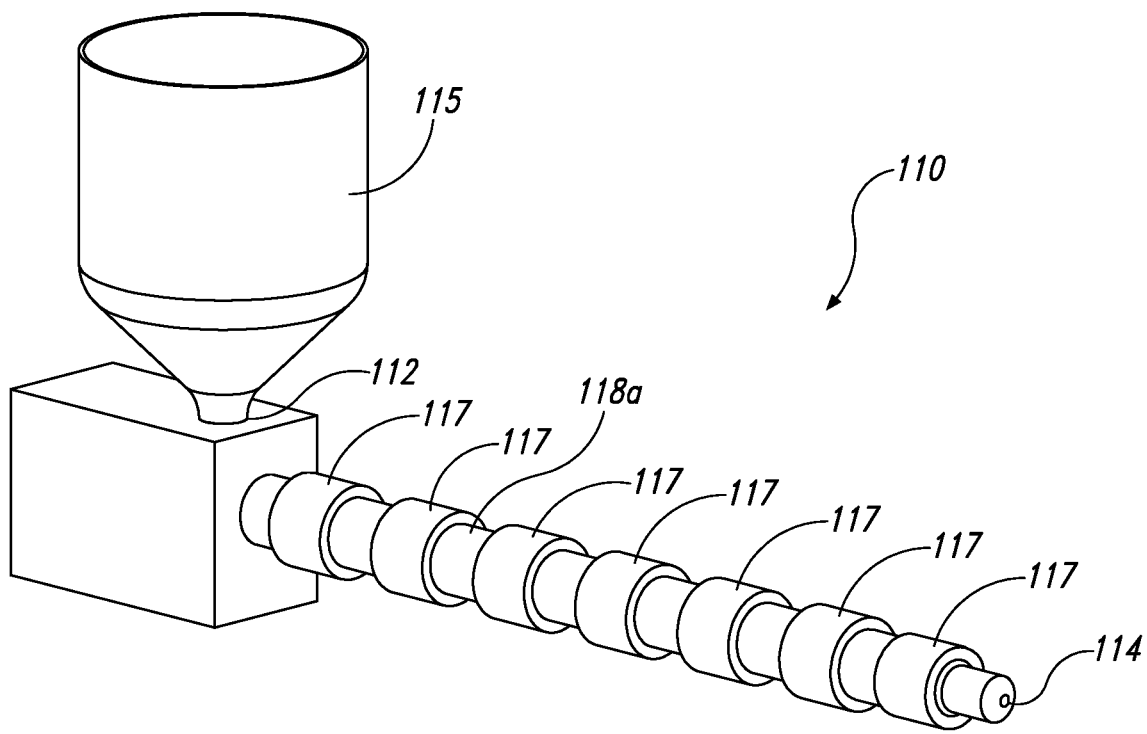
FIGS. 2A-D show a solid perspective, a see-through perspective, an end, and a cross-sectional view of the extruder component of the machine depicted in FIG. 1.
Figure 2B:
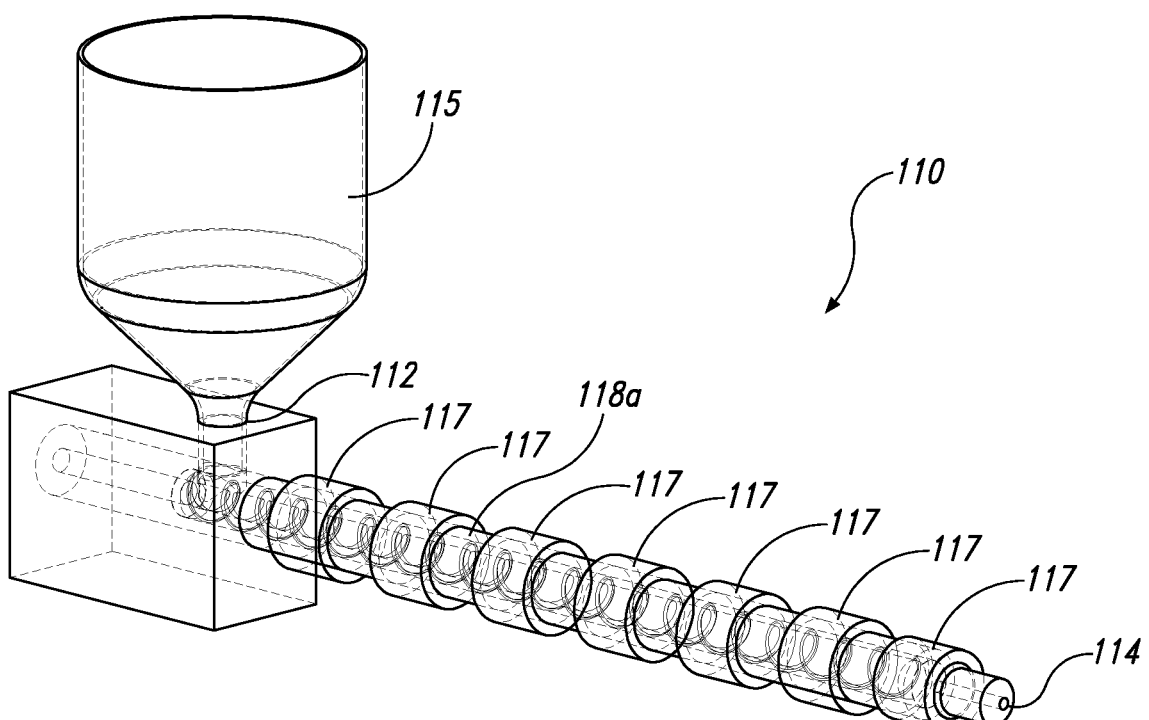
Figure 2C:
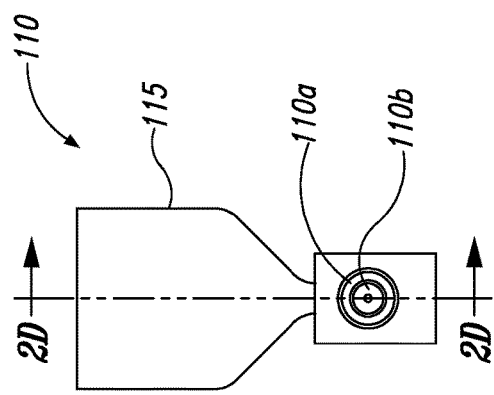
Figure 2D:
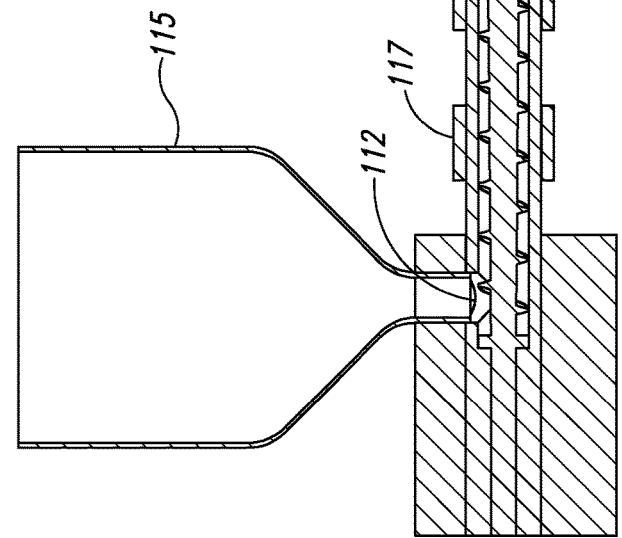
Figure 3A:
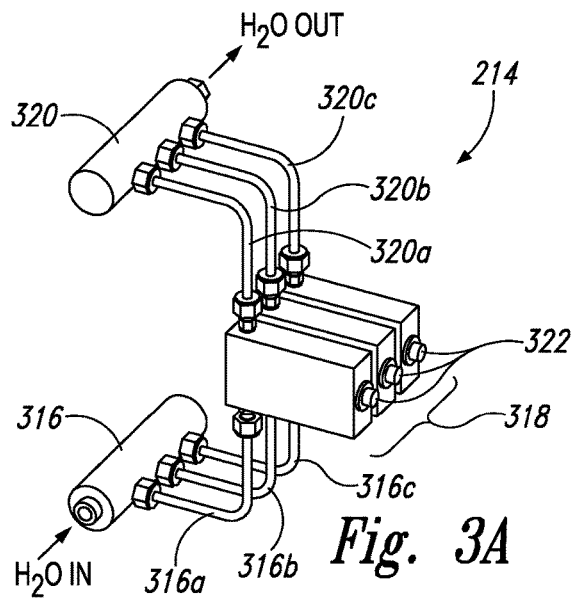
Figure 3B:
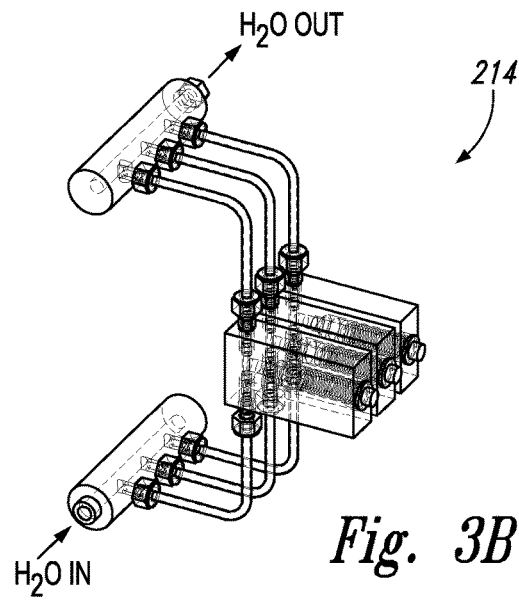
Figure 3C:
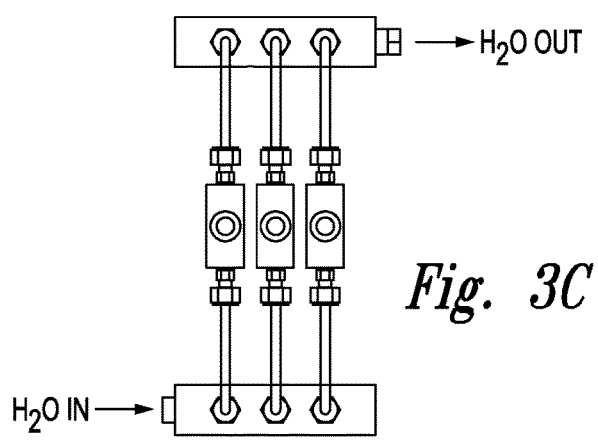
Figure 3D:
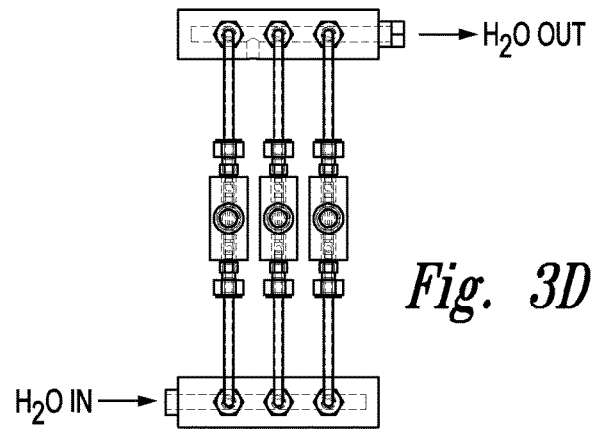
Figure 3E:
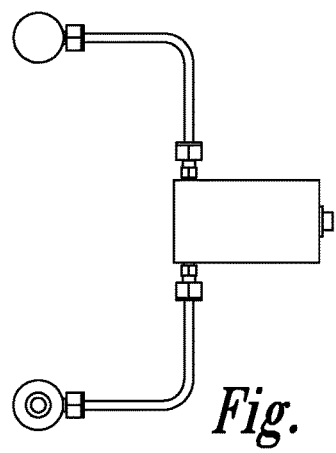
Figure 3F:
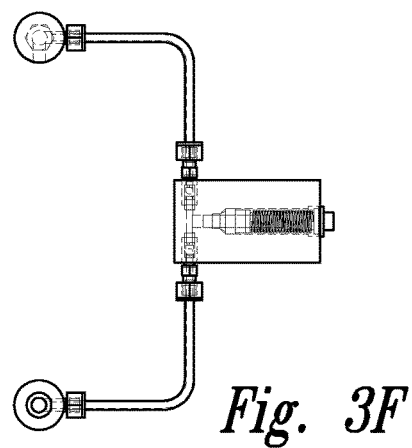
Figure 5D:
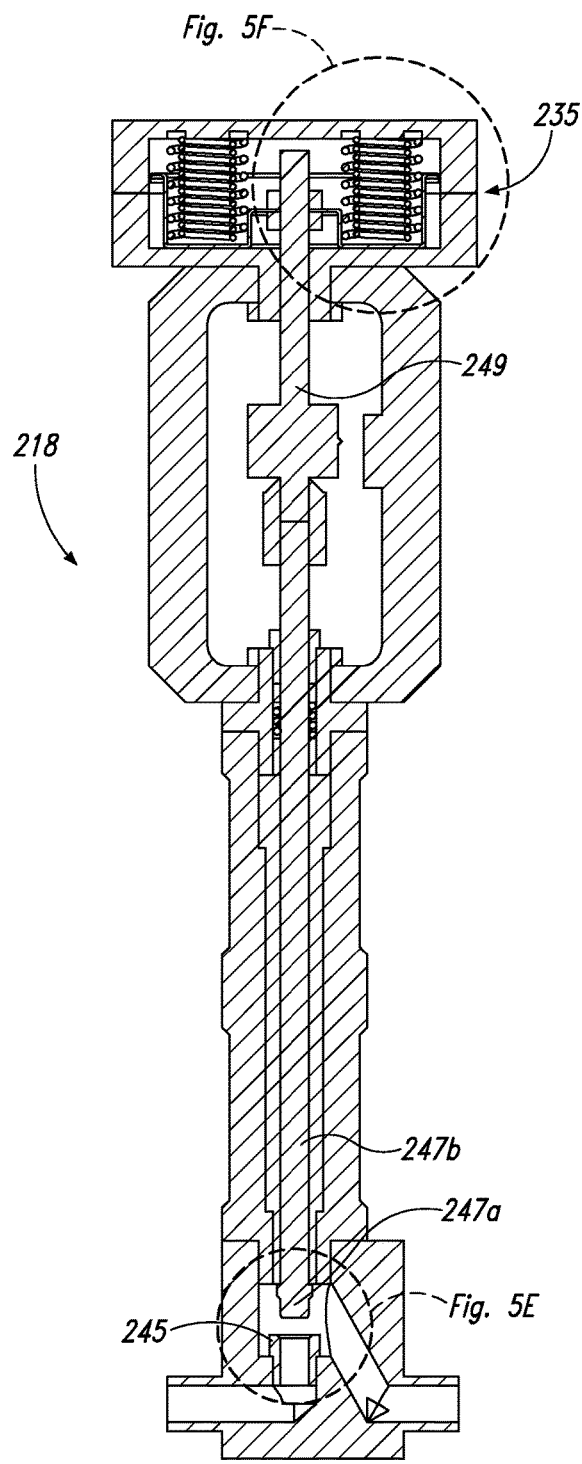
Figure 5C:
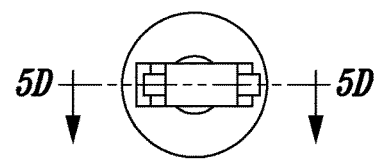
Figure 5E:
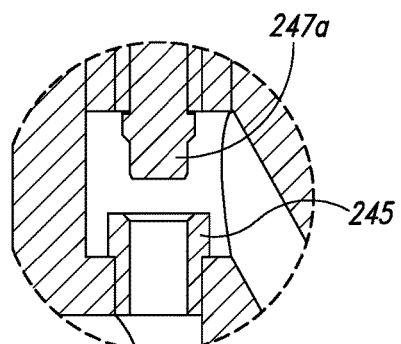
Figure 5F:
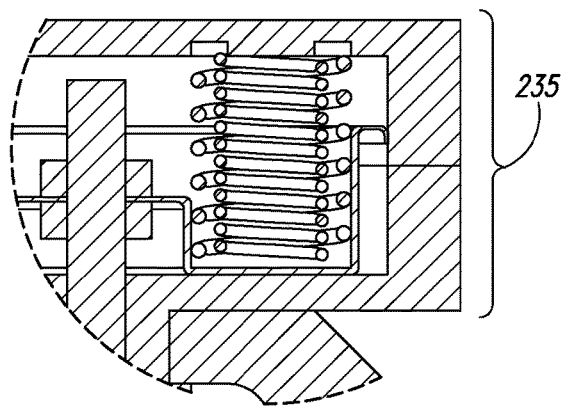
Figure 5G:
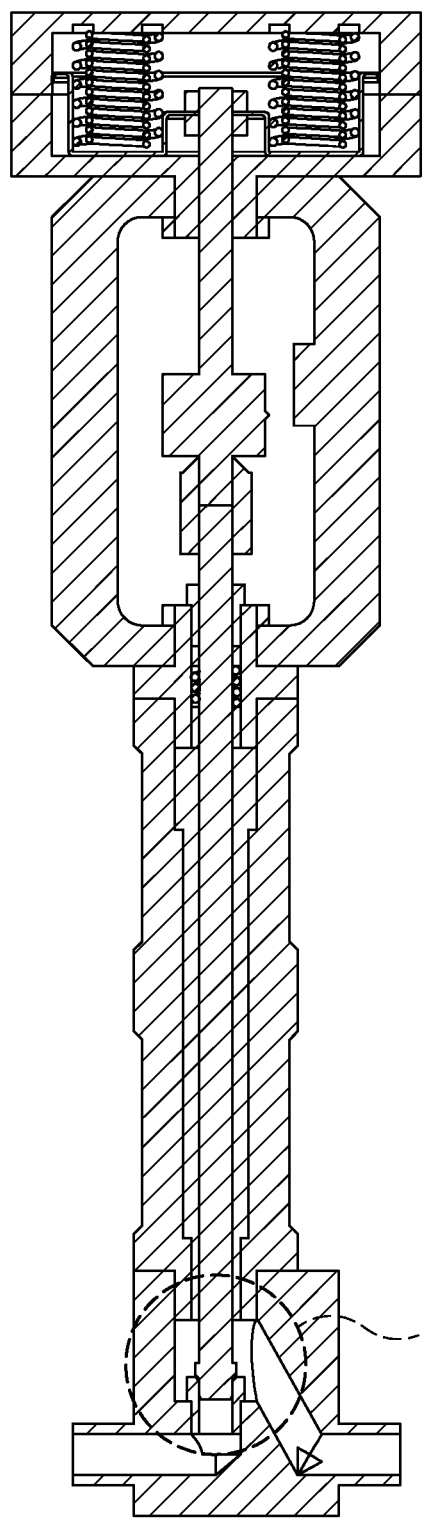
Figure 5H:
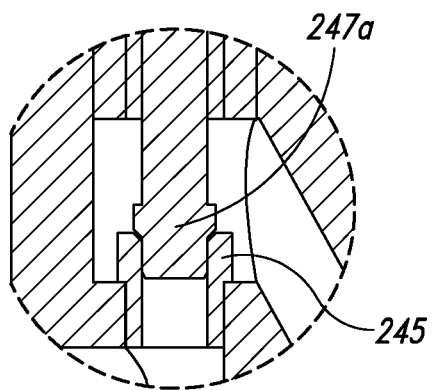

Referring now to FIG. 1, an overview "process flow diagram" of the inventive machine/system 10 is given that illustrates, among other things, the various mechanical components (of the inventive machine/system 10) in relation to one another and to the flow of materials (i.e., selected polymeric feedstock material, water, and reaction products) into and out of the various components. More specifically, and as shown within separate "dashed-line" ("- - - - -") regions, the inventive machine/system 10 includes four different processing zones; namely, (1) an upstream extruder-based biomass and/or waste plastic materials conveyance and plasticization/moltenization zone 100 where a selected solid polymeric feedstock material is fed, conveyed, heated, pressurized, and transformed into a molten state; (2) an upstream steam generation and manifold distribution zone 200 where ordinary water is pumped, heated and pressurized to supercritical, or near supercritical, conditions; (3) a central supercritical water reaction zone 300 where the plasticized/moltenized polymeric extrudate material and high-energy/SCW water confluence and undergo chemical reaction; and (4) a downstream pressure let-down and reaction product separation zone 400 where the liquid reaction products including, for example, sugar solutions, hydrocarbon mixtures (dubbed "neodiesel"), and water (and sometime gas), are depressurized, cooled, and separated from one another.

As shown in FIG. 1, these four different zones 100, 200, 300, 400 are mechanically and fluidicly connected to one another to form a single unitary machine/system 10 that, in some embodiments, is mobile and, thus, readily transportable by land or by sea. The inventive machine/system 10 disclosed herein is fully scalable (meaning capable, in some embodiments, of processing up to about 50 tons/day of feedstock material) and readily controllable (tuneable) to minimize the amount of water (and energy) needed to liquefy a wide range of biomass and/or waste plastic feedstock materials (including, for example, raw biomass, lignin and all types of mixed waste plastic materials).

More specifically, and as depicted in the process flow diagram of FIG. 1 in view of FIGS. 2A-D, the upstream extruder-based biomass and/or waste plastic materials conveyance and plasticization/moltenization zone 100 (of the inventive machine 10) comprises a single screw extruder 110 having an inlet 112 and a downstream outlet 114, wherein the downstream outlet 114 is coincident with the longitudinal axis of the extruder 110. As best shown in FIGS. 2A-D, the extruder 110 includes an outer barrel 110a having an inner rotatable screw 110b (tapered) connected to an external motor (not shown). The external motor, in turn, is connected to an external electrical power source (also not shown). The extruder 110 includes a hopper 115 connected to the inlet 112 of the extruder and is used for holding and releasing/feeding a selected polymeric material ("feedstock"), in either a pelletized or shredded form, into the extruder 110. To facilitate moltenization of the selected feedstock material, a plurality of outer heating bands 117 is positioned about the barrel 110a of the extruder 110. The outer heating bands 117 are energized, when additional heat is needed, by an alternating current (AC) power source (not shown). The plurality of outer heating bands 117 may be selectively energized or set, for example, to progressively maintain internal temperatures along the barrel 110a of the extruder 110 ranging from, for example, 150° F. to 550° F. (depending on the type of feedstock material being processed).

During operation of the machine 10, the selected polymeric material is continuously fed into the extruder 110 by means of the hopper 115—the feed material is then heated, pressurized, and becomes molten as it is conveyed from the inlet 112 to the downstream outlet 114. The speed of rotation of the inner screw 110b (which is governed by the motor) controls the flow rate of the molten extrudate. In certain embodiments, the plasticized/molten extrudate exiting the downstream outlet 114 of the extruder 110 is in the form of a continuously flowing cylinder of molten polymeric material (which, conceptually, may be thought as being similar to that of a flexible spaghetti noodle exiting a pasta maker). For purposes of illustration and not limitation, the extrudate flow rate may be, for example, maintained (computer controlled) at a constant steady-state flow rate of about 5 lbs/hr and a temperature of about 550° F.

As further depicted in the process flow diagram of FIG. 1 and in view of FIGS. 3A-J (manifolded high-pressure pump views) and FIGS. 4A-D (steam generator views) and FIGS. 5A-H (high-pressure valve views), the upstream steam generation and manifold distribution zone 200 (of the inventive machine 10) comprises an upstream water source (not shown), a water filter 210 (for removing trace impurities from the input feed water flow stream), a flow meter 212 (for monitoring the flow rate of water entering into the machine 10), a specialized high-pressure positive displacement pump assembly 214 (for continuously pumping liquid water at a steady/constant flow without pulsations), a steam generator 216 (for producing a continuous flow of supercritical water or high-energy water at near supercritical conditions), a first high-pressure valve assembly 218 (for controlling the flow rate of the supercritical or high-energy water produced by the steam generator 216), and a pressure release valve 219 (for added safety and having a set point ("SP") of about 10,000 psi, for example). For purposes of illustration and not limitation, the supercritical or high-energy water flow rate may also, for example, be maintained (computer controlled) at a constant steady state flow rate of about 5 lbs/hr and a temperature of about 800° F., while the first high pressure valve is set to maintain (via computer control) a constant upstream pressure of about 3,500 to 5,000 psi (depending on the type of feedstock material being processed).

Referring more specifically to FIGS. 3A-J, the specialized reciprocating positive displacement high-pressure pump assembly 214 comprises a water intake manifold 316 (plenum for splitting the input feed water flow stream into three separate smaller input flow streams contained within three separate stainless steel tubes 316a, 316b, 316c), a central three-piston positive displacement pump assembly 318, and a water outtake manifold 320 (plenum for combining the three separate output flow streams, contained within three separate stainless steel tubes 320a, 320b, 320c, back into a single flow stream contained within the water outtake manifold 320). In this configuration, the high-pressure pump assembly 214 is able to continuously pump ordinary liquid water at a steady/constant flow rate without pulsations (which is important to maintain downstream system stability) to high-pressure conditions.

More specifically, precise metering of water at high pressure is attained by use of three offset positive displacement, reciprocating pistons 322. Each piston 322 is driven by a constant speed motor (not shown) via a specially contoured cam (also not shown). The cam profile is designed such that each piston 322 rapidly intakes and delivers a smooth, constant volume of water to the end of the piston stroke. Thus, motor efficiency is maximized and pulsation minimized.

In other words, and in this configuration, precise metering of water at high pressure (up to 5,000 psi) is attained by the positive displacement and reciprocating action associated with each piston 322. As shown, the water outtake manifold 320 combines the outflow of each of the three pistons 322 back into a single substantially pulse-free water output flow stream. In certain preferred embodiments, the pump housing components, tubing and intake and outtake manifolds 316, 318 are each made of type 316 stainless steel because of its superior resistance to corrosion, while the pistons 322 are each made of sapphire and the inlet and outlet valves (associated therewith) incorporate sapphire seats 325 and ruby balls 327 (as best shown in FIGS. 3H-J).

Referring now to FIGS. 4A-D, the steam generator 216 component (of the inventive machine 10) is shown to consist essentially of a vertically oriented outer pipe 216a concentrically positioned about an inner heater rod 216b. The inner heater rod 216b, in turn, is electrically connected to an alternating current (AC) power source (not shown) and, thus, may be selectively (computer controlled) energized to maintain internal temperatures of up to about 1,000° F. and pressures up to about 5,000 psi (and even up to 10,000 psi). During operation of the machine 10, high-pressure water exiting the high-pressure pump assembly 214 is fed into the bottom of the steam generator 216 by way of a water inlet 217. The water is then heated, further pressurized and becomes highly energized as it moves upward through the annular space that exists between the inner heater rod 216b and the concentrically positioned outer pipe 216a. The high-energy water is then expelled out of the steam generator 216 by way of the high-energy water outlet 219 positioned at the top of the steam generator 216.

Referring now to FIGS. 5A-H, the first high pressure valve 218 (which valve is substantially the same as the downstream second and third high pressure valves 410, 414 except for slight sizing differences—with the latter second and third valves 410, 414 being dimensioned slightly larger to handle the larger downstream flow rates associated with the combined water/reaction products flow stream) is configured to selectively and precisely control (via computer) the flow rate of the supercritical or high-energy water produced by the steam generator 216. As best shown in FIG. 5D-H, the first high pressure valve 218 comprises an actuator 235 that controllably moves (up and down) a valve plug 247a (cylindrical) into and away from a counterpart valve seat 245. As shown, the cylindrical valve plug 247a (connected to plug stem 247b) is configured to fit snuggly into the valve seat 245. The position of the valve plug 247a relative the valve seat 245 determines the cross-sectional area between the plug 247a and the seat 245, which, in turn, controls the flow rate. The plug stem 247b is connected to an actuator stem 249, which, in turn, is connected to the actuator 235. In certain preferred embodiments, the various components that comprise the first high pressure valve 218 (as well as the second and third high-pressure valves 410, 414) are each made of type 316 stainless steel because of its superior resistance to corrosion. Moreover, and in this pressure valve configuration and unlike conventional globe valves (that generally need to be water cooled to prevent heat damage to the actuator components), the flow rate of the supercritical or high-energy water produced by the steam generator 216 may be readily and precisely controlled.

Figure 6A:
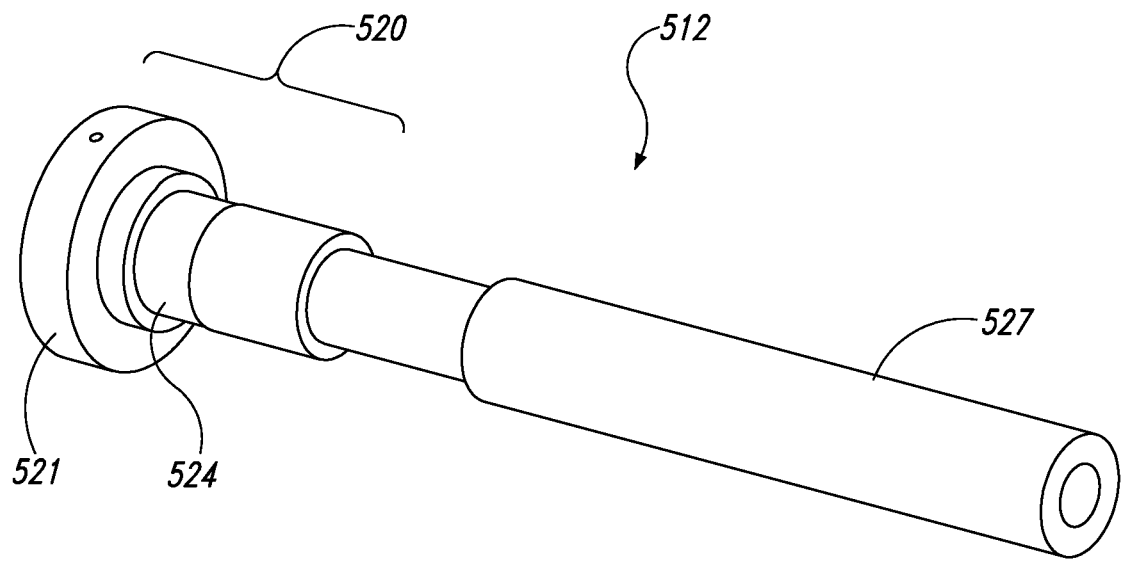
FIG. 6A-J show various different views (e.g., solid perspective, see-through, exploded, and cross-sectional) of the supercritical water reactor component of the machine depicted in FIG. 1, including various views of its various main sub-components including a manifold baseplate, a manifold housing, an inner manifold distributor, a coned shape occlusion, and tubular reactor shells (in accordance with an embodiment of the present invention).
Figure 6B:
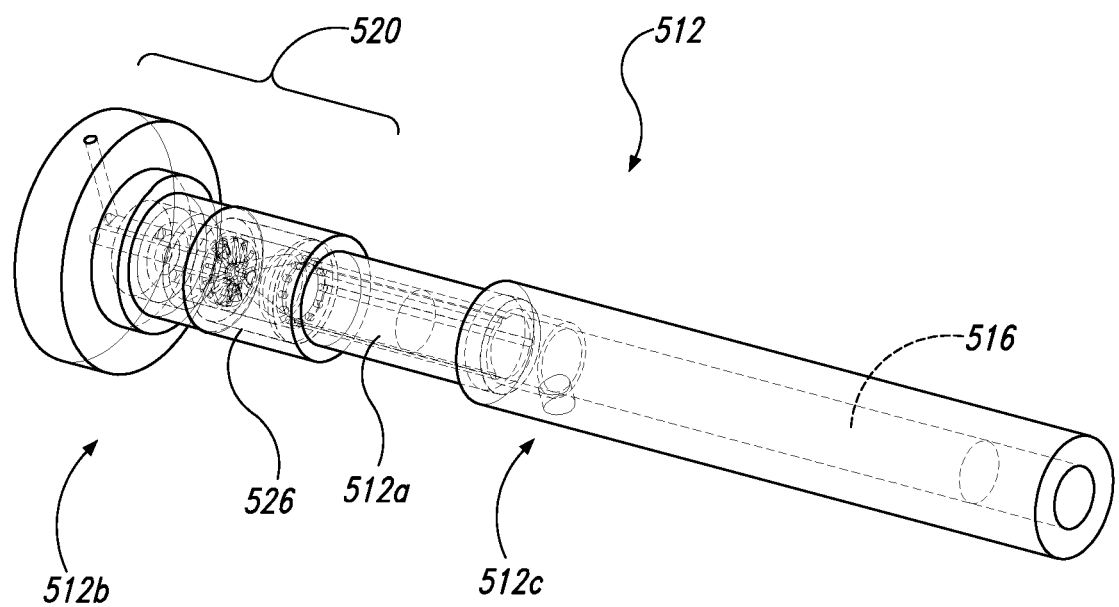
Figure 6C:
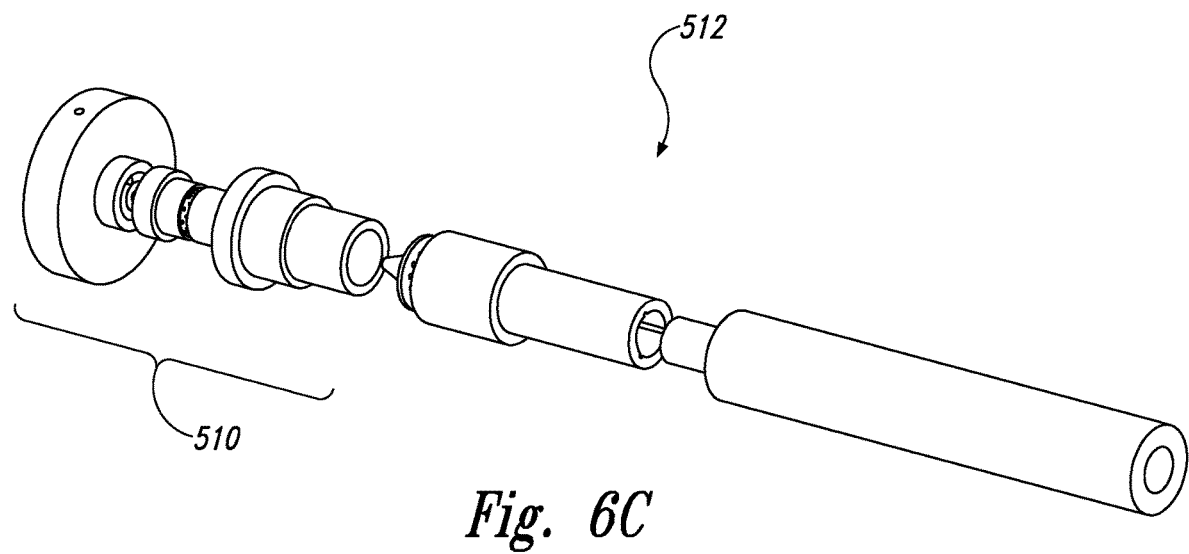
Figure 6D:
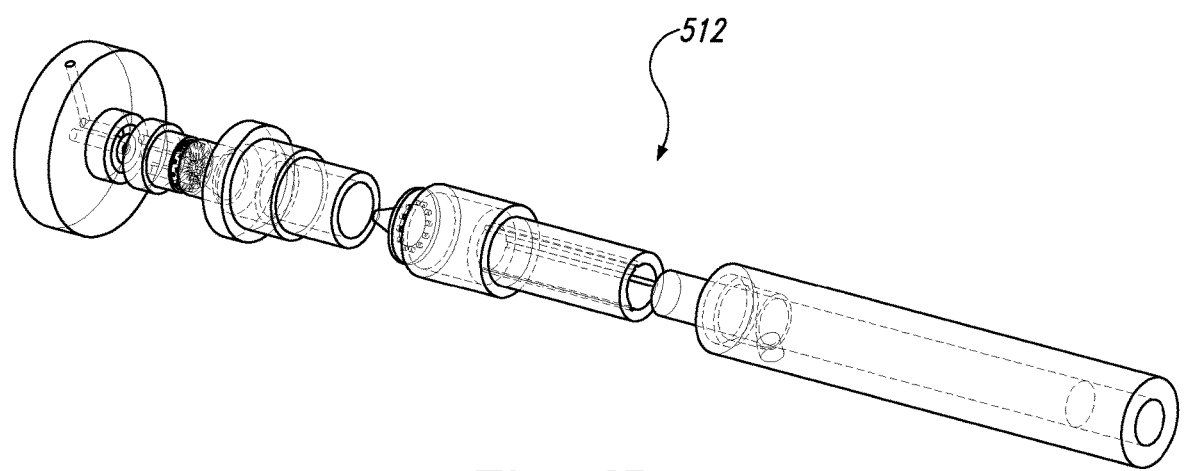
Figures 6E, 6F:
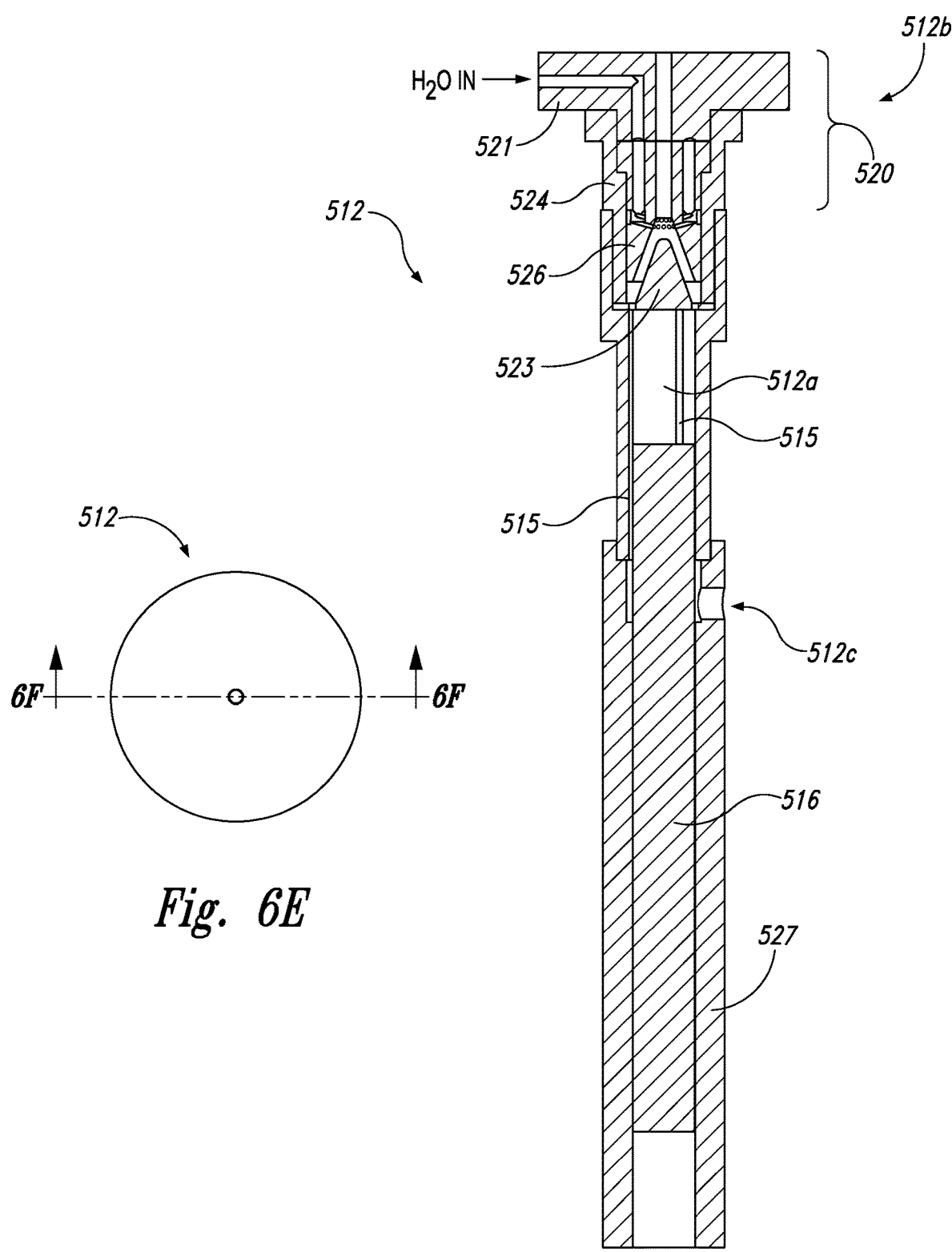

As still further depicted in the process flow diagram of FIG. 1 and in view of FIGS. 6A-J and FIGS. 7A-F (supercritical water reactor views) and in further view of FIGS. 8A-12C (individual reactor component views), the central supercritical water reaction zone 300 (of the inventive machine 10) comprises a tubular reactor 512 having (as best shown in FIG. 6F) an interior space 512a (plenum) that includes a plurality of reactor flow channels 515 fluidically connecting the inlet end 512b to the outlet end 512c (of the tubular reactor 512). The plurality of reactor flow channels

515 may, in some embodiments, be in the form of longitudinal grooves disposed along the inner wall of the central tubular reactor 512.

Figure 6G:
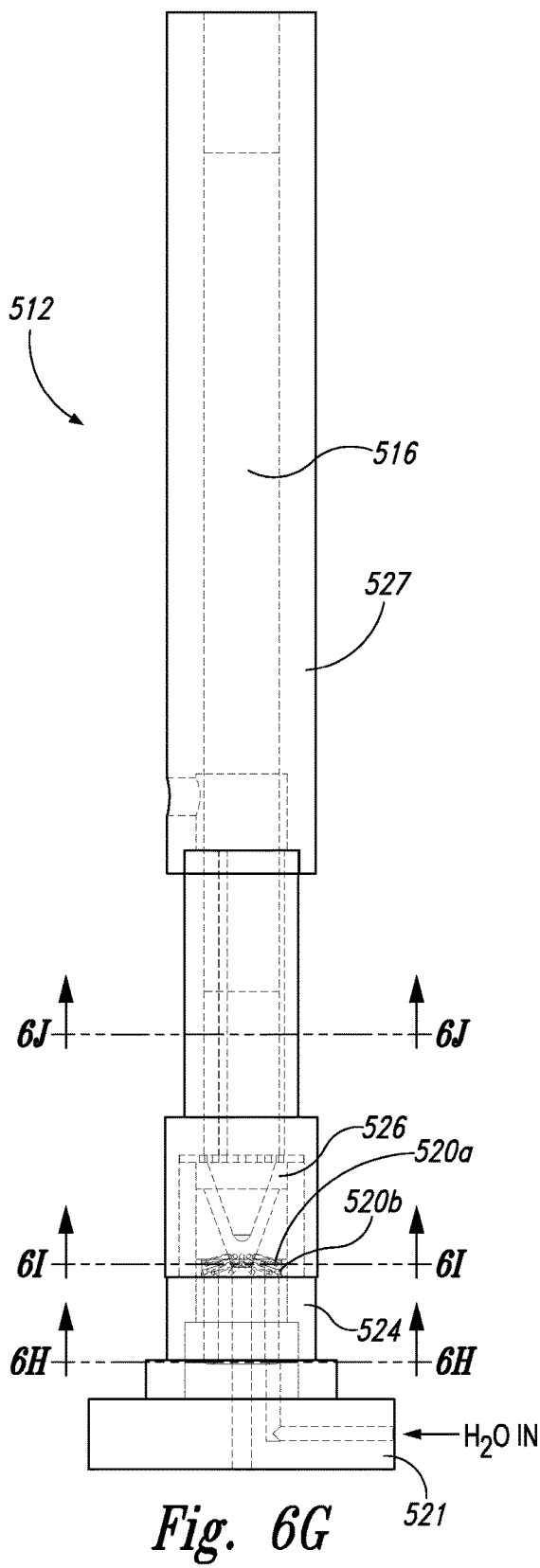
Figure 6H:
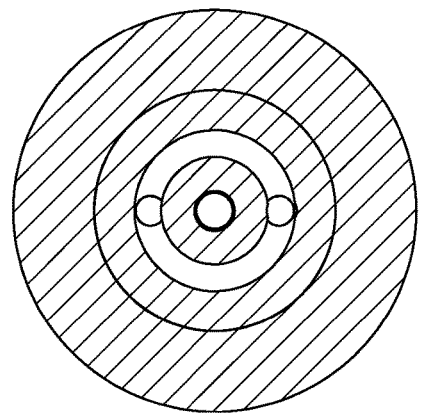
Figure 6I:
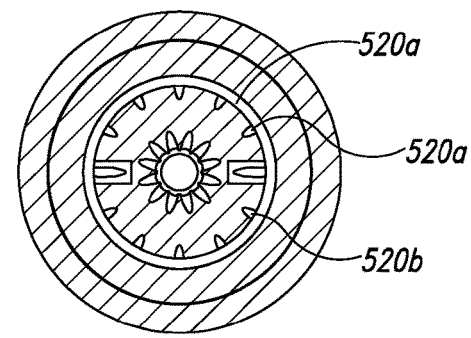
Figure 6J:
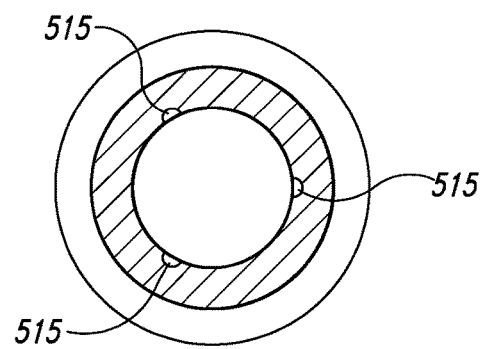
Figure 7A:
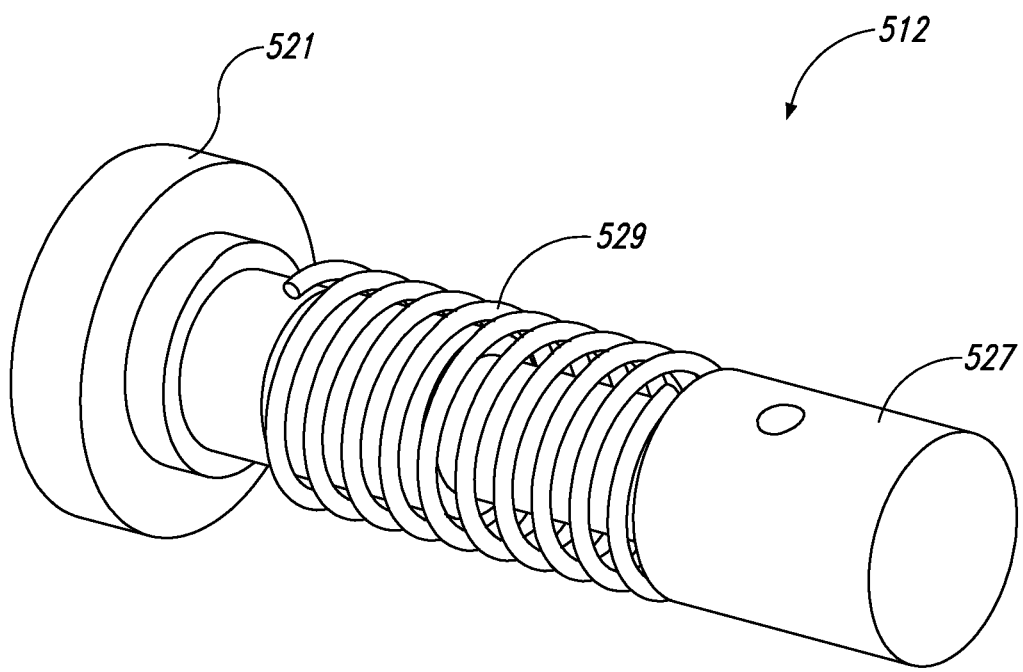
FIG. 7A-F show various different views (e.g., solid perspective, see-through, exploded, and cross-sectional) of the supercritical water reactor component of the machine depicted in FIG. 1, including various views of its various main sub-components including a manifold baseplate, a manifold housing, an inner manifold distributor, a coned shape occlusion, and tubular reactor shells (in accordance with another embodiment of the present invention).
Figure 7B:
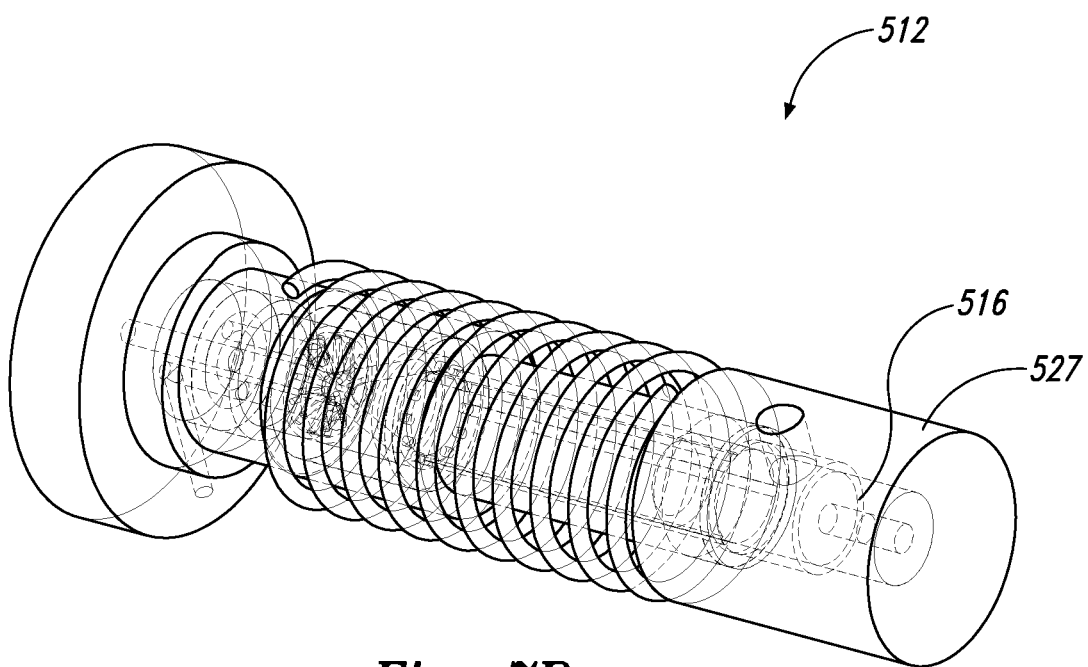
Figure 7C:
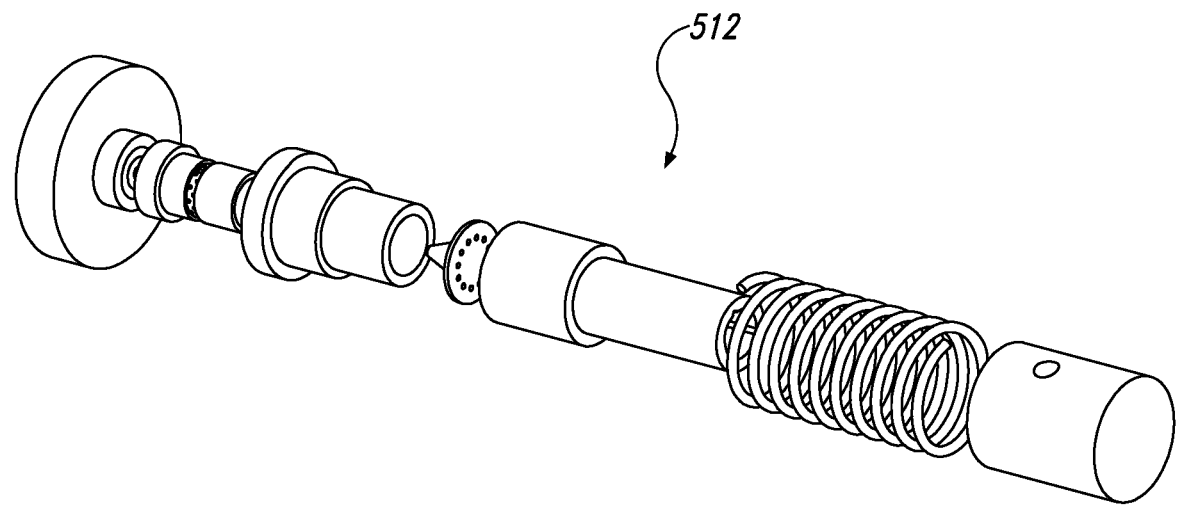
Figure 7D:
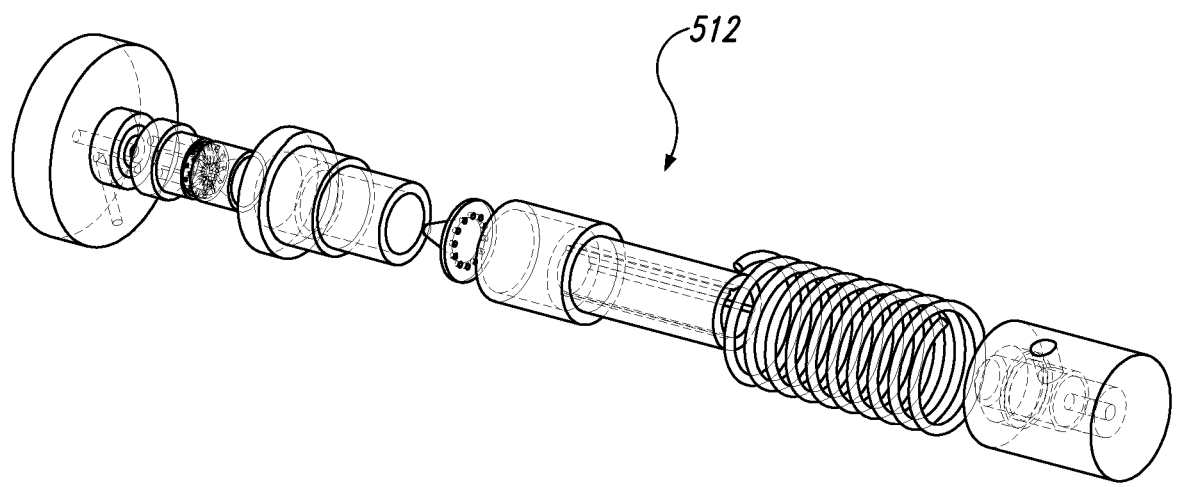
Figure 7E:
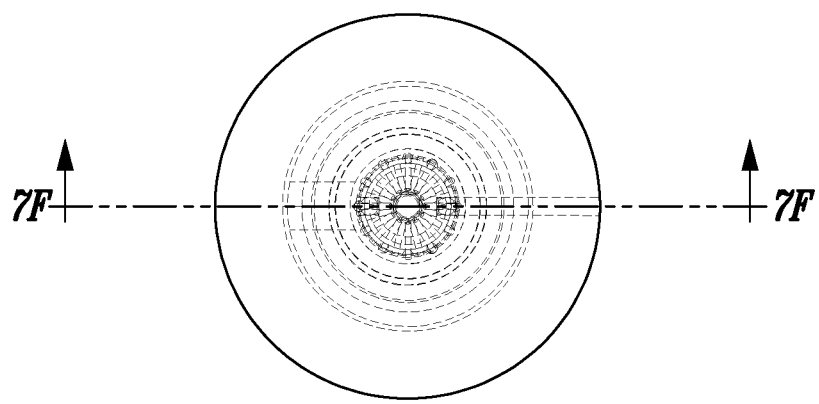
Figure 7F:
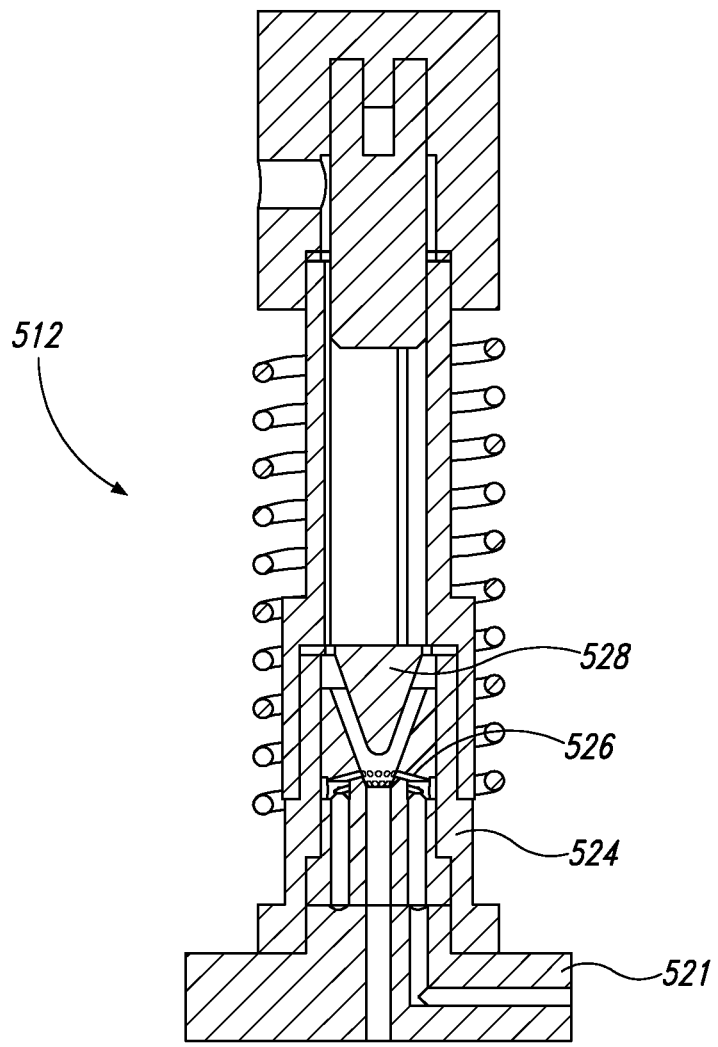
Figure 8A:
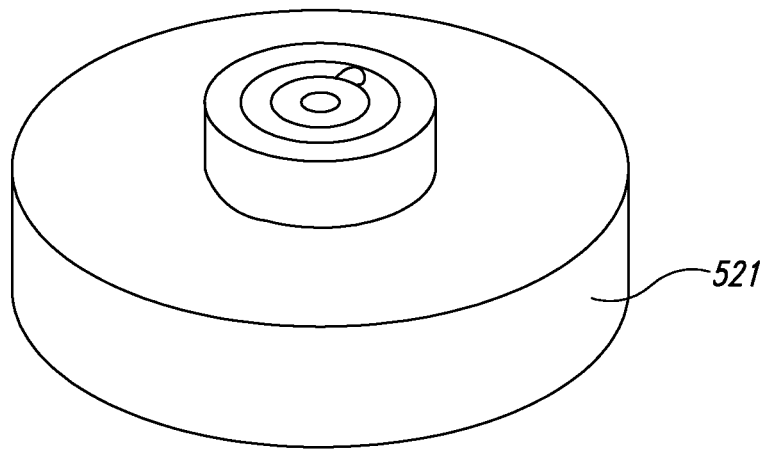
FIGS. 8A-C show representative views (solid perspective, see-through, and side) of the manifold baseplate (showing a central extrudate inlet through-hole and a radial supercritical water inlet through-hole—but not showing bolt through-holes for bolting onto extruder) in accordance with an embodiment of the present invention.
Figure 8B:
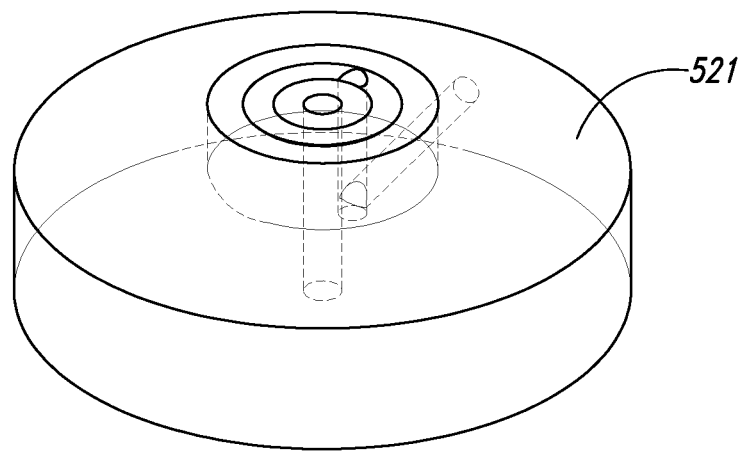
Figure 8C:
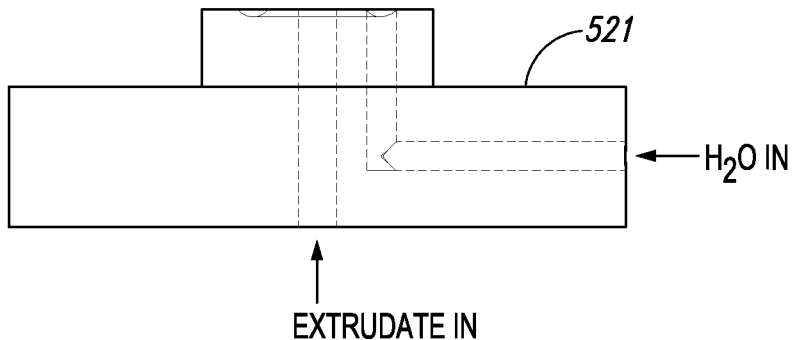
Figure 9A:
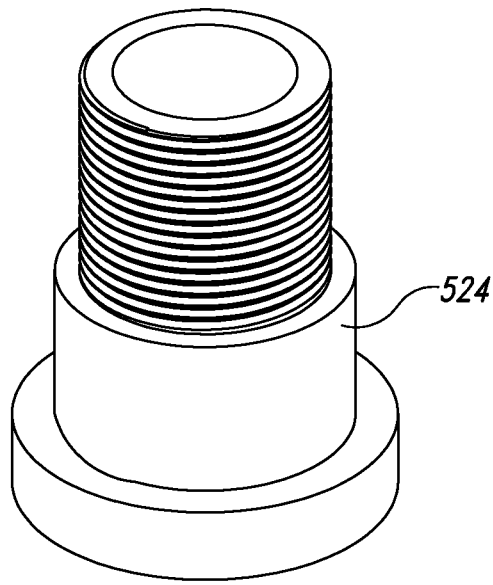
FIGS. 9A-B show representative views (solid perspective and see-through) of the manifold housing in accordance with an embodiment of the present invention.
Figure 9B:
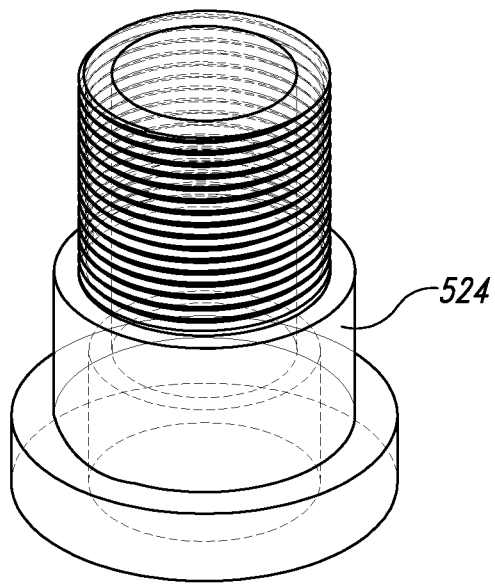
Figure 10A:
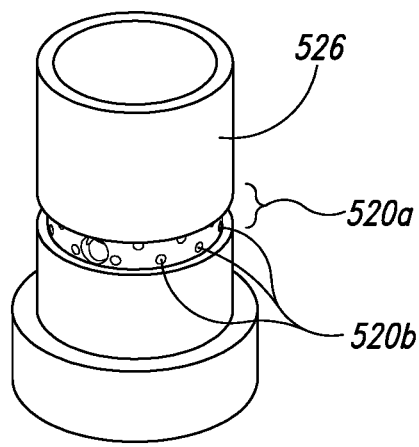
FIGS. 10A-F show representative views (solid perspective, see-through, side, top and bottom) of the inner manifold distributor (having a plurality of circumferential supercritical water flow through-holes about, and fluidicly connected to, a central extrudate through-hole) in accordance with an embodiment of the present invention.
Figure 10B:
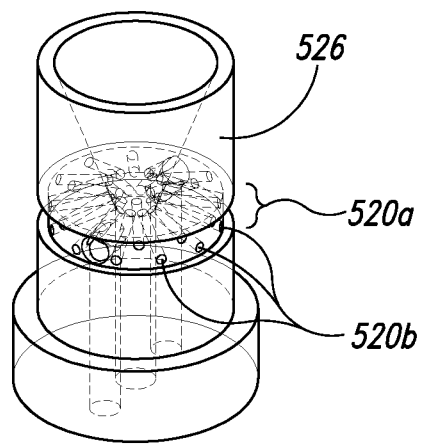
Figure 10C:
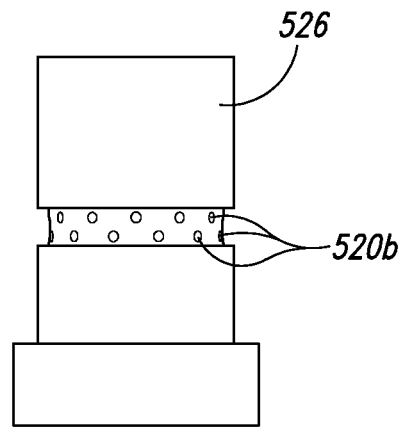
Figure 10D:
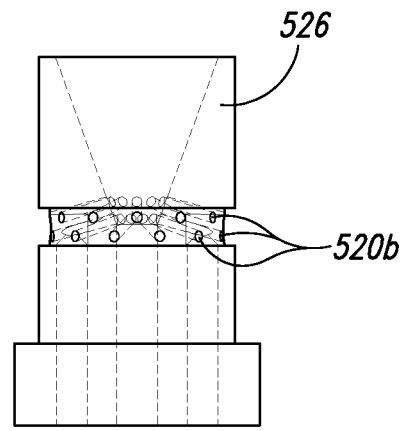
Figure 10E:
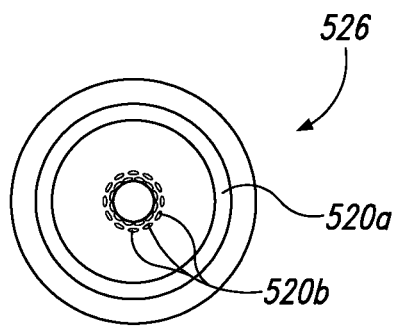
Figure 10F:
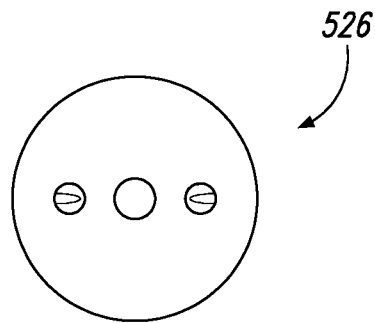
Figure 11A:
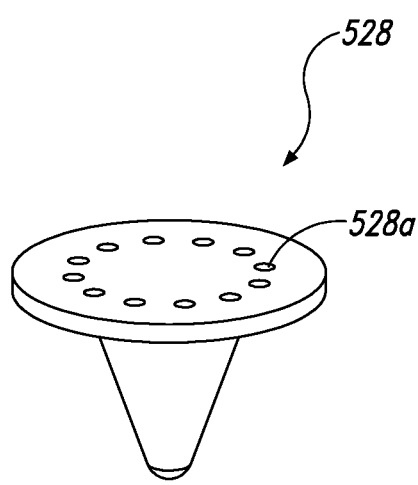
FIGS. 11A-D show solid and see-through perspective views of the cone shaped occlusion (having a plurality of flow through-holes positioned about a base plate of the cone shaped occlusion) in accordance with an embodiment of the present invention.
Figure 11B:
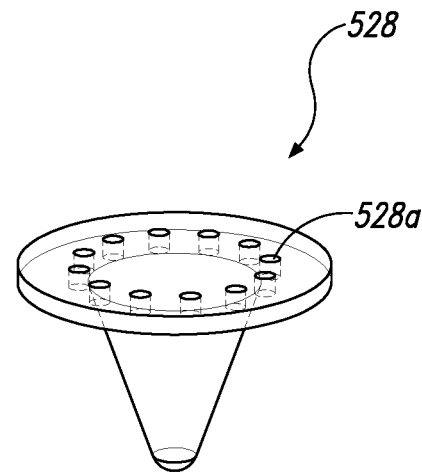
Figure 11C:
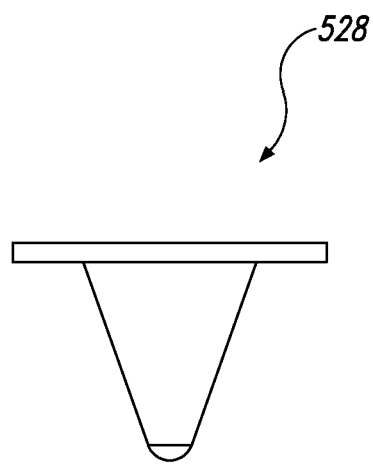
Figure 11D:
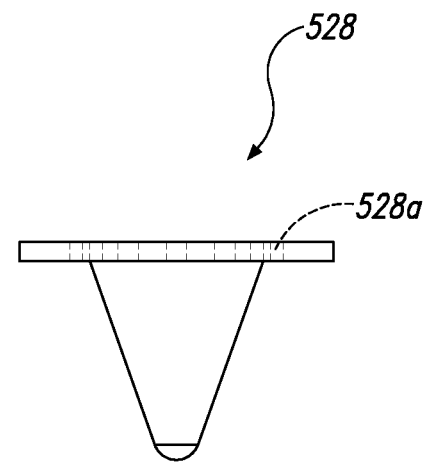
Figure 12C:
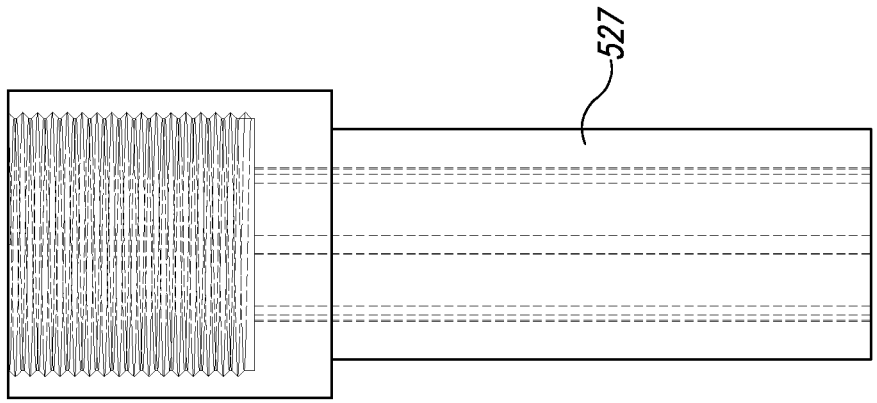
FIGS. 12A-C show solid and see-through perspective side views of a tubular reactor shell component having a plurality of flow channels positioned lengthwise along the inner wall of the reactor shell in accordance with an embodiment of the present invention.
Figure 12B:
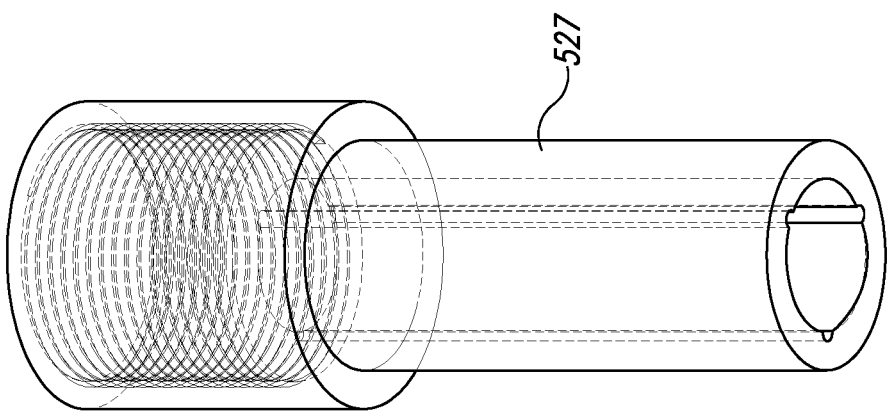
Figure 12A:
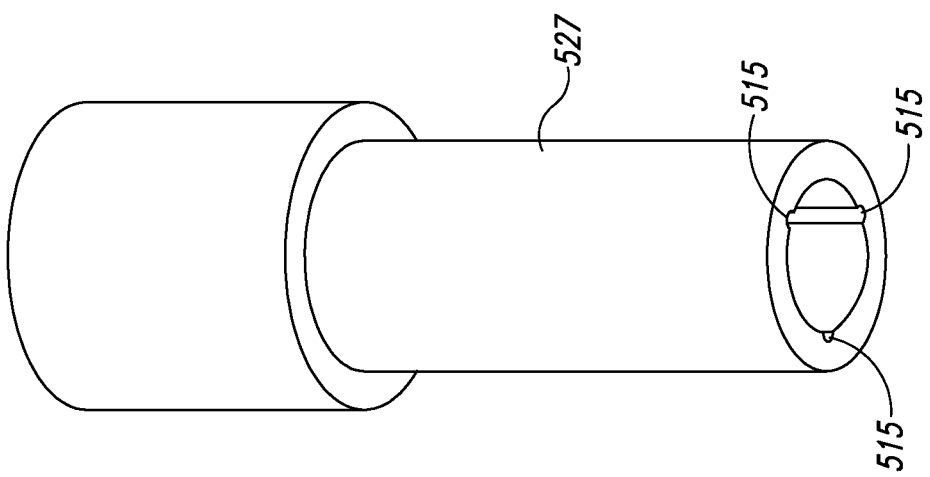

As shown, the tubular reactor 512 further comprises an inlet manifold 520 for evenly distributing the supercritical or high-energy water produced by the steam generator 216 about and into the molten extrudate (exiting the downstream outlet 114 of the extruder 110). As best shown in FIGS. 6G and 6I, the inlet manifold 520 may form a ring 520a having a plurality of inwardly facing exit portals 520b (wherein the plurality of exit portals 520b is circumferentially positioned about the inner surface of the ring as shown). Thus, and in some embodiments, the inlet manifold 520 may comprise a manifold baseplate 521, a manifold housing 524, an inner manifold distributor 526, and a cone-shaped flow-through occlusion 528 (all of which components are nested together as shown to form the inlet manifold 520). The inlet manifold 520 is, in turn, threadedly connected to a tubular reactor shell component 527 of the tubular reactor 512.

As generally shown in the various views associated with FIGS. 6A-J, the inlet end 512b of the tubular reactor 512 is configured such that, under operating conditions, a flowing molten polymeric extrudate exiting the outlet 114 of the extruder 110 and entering into the interior space 512a of the tubular reactor 512 is radially impinged upon by the flowing supercritical or high-energy water that is simultaneously exiting out of the plurality of circumferentially positioned exit portals 520b. As depicted in FIG. 1, the inlet end 512b of the tubular reactor 512 is adjacent and fluidically connected to the outlet 114 of the extruder 110. The novel and axially aligned cone-shaped flow-through occlusion 528 (having a plurality of reactant flow through-holes 528a positioned about the base plate of the cone portion as best shown in FIGS. 11 A-D) is centrally positioned near the tubular reactor's 512 inlet end 512b. The cone-shaped flow-through occlusion 528 facilitates spreading and thinning of the centrally flowing molten extrudate (as the extrudate flows over the cone and through the reactant flow through-holes 528a) during operation of the machine 10. In other embodiments, the flow-through occlusion 528 takes the form of a hemi-spherical dome or a flat plate having one or more holes). In this way, near-instantaneous liquefaction is achieved due to the regulated penetration and mixing of the molten feedstock material with controlled or minimum amounts of supercritical water or high-energy water.

As shown in the embodiments represented in FIGS. 7A-F, and in order to maintain set temperatures and steady-state operating conditions, a circumferentially positioned, high efficiency alternating current (AC) induction coil 529 (connected to and forming part of an induction heater—not shown) is positioned about the reactor shell component 527 the tubular reactor 510 to supply additional heat energy (via computer control) when needed.

The novel tubular reactor 512, in some embodiments, further comprises a movable ram 516 centrally positioned within the tubular reactor 512. The ram 516 (which may be in the form of a rod and is sometimes referred to as a "spear") is movable back and forth (via a ram actuator—not shown) within and along the longitudinal axis of the tubular reactor 512 (to thereby increase or decrease the volume of the interior space 512a). In this way, the residence time of the supercritical water reaction occurring within the tubular reactor 512 (during operation of the machine 10) may be selectively and dynamically controlled (with longer residence times corresponding to larger reactor volumes). Finally, an annular manifold reaction products outlet space 520 is positioned about the outlet end 512c of the tubular reactor 512. The reaction products outlet space 520 is fluidically connected to the interior space 512a (plenum) (of the tubular reactor 512) by way of the plurality of reactor flow channels 515.

As still further depicted in FIG. 1, the downstream pressure let-down and reaction product separation zone 400 (of the inventive machine 10) comprises another (a second) high pressure valve 410 (for controlling the flow rate of the plurality of reaction products produced within and exiting out of the tubular reactor 512) that, in turn, is fluidically connected to a (first) downstream expansion (pressure let-down) chamber 412. The expansion chamber 412 expands and cools the compressed reaction products, thereby stopping further chemical reaction. A third valve high pressure valve 414 (for controlling the flow rate of the plurality of reaction products exiting the expansion chamber 412) is positioned between, and fluidically connected to, both the first expansion chamber 412 and a (second) downstream reaction product separation chamber 416 (where the reaction products are further expanded, cooled, and gravity separated from one another substantially along their density differences (demarcations) of gases (top) versus oily hydrocarbon mixture (middle) versus water (bottom)).

Put differently, a middle oily mixture layer (product) is produced that floats on of a bottom water layer (recycled), while any gases will find their way to the top. From top to bottom, the separation chamber 416 includes a gas outlet 416a, an oily hydrocarbon mixture outlet 416b, and a water outlet 416c. For purposes of illustration and not limitation, the reaction products flow rate may be, for example, maintained at a constant flow rate of about 10 lbs/hr (or equal to the combined flow rates of the supercritical/high-energy water and extrudate flow streams). In addition, and in some embodiments, the second high-pressure valve 410 is set to maintain a constant upstream pressure of about 3,250 psi (in the reaction products outlet space 520 fluidicly connected to the interior space 512a (plenum) of the tubular reactor 512), while the third high-pressure valve 414 is set to maintain a constant upstream pressure of up to about 1,500 psi (in the expansion chamber 412).

While the present invention has been described in the context of the embodiments described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A reactor system connectable to the output end of an extruder; comprising:
   a steam generator fluidically connected to a downstream reactor inlet manifold, wherein the reactor inlet manifold forms a ring having a plurality of inwardly facing exit portals, and wherein the plurality of exit portals is circumferentially positioned about the inner surface of the ring;
   a tubular reactor having an interior space disposed between an inlet end and an outlet end, wherein the inlet end of the reactor (i) is fluidically connectable to the outlet of the extruder and the plurality of exit portals, and (ii) is configured such that, under operating conditions, a flowing polymeric extrudate exiting the outlet of the extruder and entering into the interior space of the reactor is radially impinged upon by flowing hot compressed water and/or supercritical water that is exiting the plurality of circumferentially positioned exit portals; and a cone centrally positioned within the inlet end of the reactor.

* * * * *